United States Patent
Sano et al.

(10) Patent No.: US 11,306,645 B2
(45) Date of Patent: Apr. 19, 2022

(54) COOLING WATER CONTROL VALVE DEVICE

(71) Applicant: DENSO CORPORATION, Kariya (JP)

(72) Inventors: Ryo Sano, Kariya (JP); Yosuke Tanaka, Kariya (JP)

(73) Assignee: DENSO CORPORATION, Kariya (JP)

(*) Notice: Subject to any disclaimer, the term of this patent is extended or adjusted under 35 U.S.C. 154(b) by 49 days.

(21) Appl. No.: 16/985,698

(22) Filed: Aug. 5, 2020

(65) Prior Publication Data

US 2020/0362747 A1 Nov. 19, 2020

Related U.S. Application Data

(63) Continuation of application No. PCT/JP2019/004483, filed on Feb. 7, 2019.

(30) Foreign Application Priority Data

Feb. 8, 2018 (JP) .............................. JP2018-021003

(51) Int. Cl.
*F01P 7/14* (2006.01)
*F16K 3/26* (2006.01)
(Continued)

(52) U.S. Cl.
CPC ................ *F01P 7/14* (2013.01); *F16K 3/265* (2013.01); *E21B 33/038* (2013.01); *F01P 2007/146* (2013.01); *F16L 25/12* (2013.01)

(58) Field of Classification Search
CPC .... F01P 7/14; F01P 2007/146; F01P 2060/08; F01P 2060/16; F01P 7/165; F16K 3/265;
(Continued)

(56) References Cited

U.S. PATENT DOCUMENTS

2009/0223657 A1* 9/2009 Hollis ................... F16K 31/041
165/287
2016/0010536 A1* 1/2016 Murakami .......... F16K 11/0876
137/625.44
(Continued)

FOREIGN PATENT DOCUMENTS

JP 2002-364634 12/2002
JP 2002364634 A * 12/2002
(Continued)

*Primary Examiner* — Yi-Kai Wang
(74) *Attorney, Agent, or Firm* — Nixon & Vanderhye P.C.

(57) ABSTRACT

A housing unit includes a cylindrical passage member, through which cooling water flows. A valve unit includes a valve main body rotatable around its axis and a valve opened portion formed in an outer peripheral surface of the valve main body, through which the cooling water can pass. A valve seat unit includes a positioned member and a valve seat surface. An outer peripheral surface of the positioned member is positioned in a radial direction by an inner peripheral surface of the cylindrical passage member and the positioned member is movable in an axial direction in a reciprocal manner. The valve seat surface holds a fluid tight condition between the valve seat surface and the valve main body when it is in contact with the outer peripheral surface of the valve main body. A biasing member biases the valve seat unit in such a way that the valve seat surface is pushed to the outer peripheral surface of the valve main body. The cylindrical passage member includes a groove formed in an inner peripheral surface thereof at least in a part of an overlapping area, at which the cylindrical passage member and the positioned member overlap each other in the axial direction. The groove is recessed in a radial-outward direction from the inner peripheral surface.

6 Claims, 17 Drawing Sheets

(51) Int. Cl.
 *E21B 33/038* (2006.01)
 *F16L 25/12* (2006.01)
(58) Field of Classification Search
 CPC .... F16K 5/0605; F16K 5/201; F16K 11/0873;
  E21B 33/038; F16L 25/12
 USPC ...................................................... 123/41.08
 See application file for complete search history.

(56) References Cited

U.S. PATENT DOCUMENTS

2017/0009894 A1   1/2017  Seko et al.
2017/0122181 A1*  5/2017  Murakami ................ F01P 7/16

FOREIGN PATENT DOCUMENTS

| | | |
|---|---|---|
| JP | 2006-234025 | 9/2006 |
| JP | 2016-109202 | 6/2016 |
| WO | 01/23791 | 4/2001 |

* cited by examiner

COOLING WATER CONTROL VALVE DEVICE

CROSS REFERENCE TO RELATED APPLICATION

The present application is a continuation application of International Patent Application No. PCT/JP2019/004483 filed on Feb. 7, 2019, which designates the U.S. and claims the benefit of priority from Japanese Patent Application No. 2018-021003 filed on Feb. 8, 2018. The entire disclosure of the above application is incorporated herein by reference.

FIELD OF TECHNOLOGY

The present disclosure relates to a cooling water control valve device.

BACKGROUND

A cooling water control valve device is known in the art, according to which a flow amount of cooling water flowing through an internal combustion engine is controlled. According to one of the cooling water control valve devices, a valve seat unit including a sleeve and a valve seat member is in contact with an outer spherical surface of a valve main body, which is rotatable around its shaft axis. The valve seat unit has an annular valve seat surface, which is capable of holding a close contact condition between the valve seat unit and the valve main body. The valve seat surface is pushed to the outer spherical surface of the valve main body by a biasing member.

In the cooling water control valve device, an outer peripheral surface of the sleeve of a cylindrical shape is positioned by an inner peripheral surface of a pipe portion of a housing in a radial direction. The sleeve is capable of reciprocating in an axial direction. A predetermined clearance is formed between the outer peripheral surface of the sleeve and the inner peripheral surface of the pipe portion in order to absorb variation of component tolerance in an aligning process of the valve seat surface to the valve main body. In a case that the clearance is excessively large, it becomes difficult to position the valve seat surface to the valve main body in the radial direction. Then, aligning accuracy of the valve seat surface may be decreased and a valve opening position may vary. On the other hand, in a case that the clearance is set at a minimum value in view of the variation of the component tolerance in order to suppress variation of the valve opening position, an aligning condition of the valve seat surface may become unstable when any extraneous material may enter the clearance. Then, a leak amount of cooling water may be increased in a valve fully-closed condition by the valve seat surface.

SUMMARY OF THE DISCLOSURE

An object of the present disclosure is to provide a cooling water control valve device, according to which a positioning accuracy of the valve seat surface to the pipe portion is high and leakage of the cooling water can be suppressed in the valve fully-closed condition.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
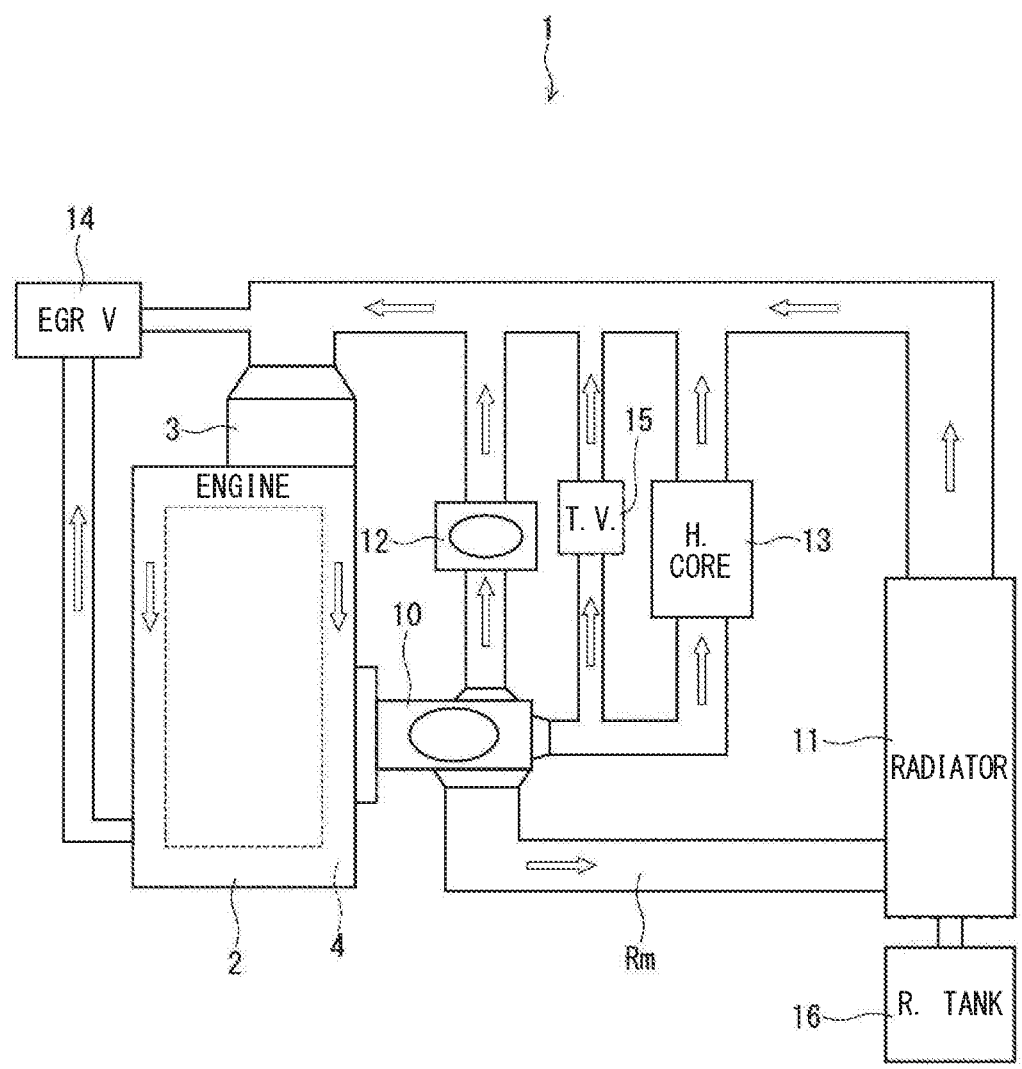
FIG. 1 is a schematic view showing an engine cooling system, to which a cooling water control valve device according to a first embodiment of the present disclosure is applied.

The cooling water control valve devices will be explained hereinafter by way of multiple embodiments with reference to the drawings. The same reference numerals are given to the same or similar structures and/or portions throughout the multiple embodiments and explanation thereof will be omitted. The substantially same structures and/or portions have the same or similar functions and effects.

First Embodiment

A cooling water control valve device of a first embodiment as well as relevant parts thereof is shown in FIGS. 2 to 9, while an engine cooling system to which the cooling water control valve device is applied is shown in FIG. 1. The cooling water control valve device 10 is used, for example, for controlling cooling water, which cools down an engine 2 as an internal combustion engine for a vehicle (not shown). More exactly, the cooling water control valve device 10 controls a flow amount of the cooling water, which passes through a main fluid passage Rm of the engine cooling system 1 of the vehicle (FIG. 1).

As shown in FIG. 1, in addition to the engine cooling system 1, the engine 2 and the cooling water control valve device 10, a water pump 3, a radiator 11, an oil cooler 12, a heater core 13, an EGR (Exhaust Gas Recirculation) valve device 14, a throttle valve device 15, a reservoir tank 16 and so on are provided in the vehicle.

The engine cooling system 1 includes the main fluid passage Rm. The water pump 3 is provided in the engine 2, so that it is connected to a water jacket 4 of the engine 2. The water pump 3 is driven by a driving power of the engine 2 to pressurize flow-in cooling water and pumps out the cooling water into the water jacket 4. The cooling water control valve device 10 is provided in the engine 2 so that it is connected to the water jacket 4 of the engine 2. Therefore, the cooling water can flow from the water jacket 4 to the cooling water control valve device 10.

The main fluid passage Rm is so formed that it connects the water jacket 4 to the radiator 11 via the cooling water control valve device 10. The cooling water of the water jacket 4 thereby flows to the radiator 11 via the cooling water control valve device 10 and the main fluid passage Rm. The radiator 11 radiates heat from the flow-in cooling water. The cooling water cooled down by the radiator 11 flows to the water pump 3 and flows into the water jacket 4 of the engine 2. It is possible to cool down the engine 2 by the cooling water, which flows into the water jacket 4 and temperature of which is low. The cooling water control valve device 10 is capable of controlling the flow amount of the cooling water passing from the engine 2 to the radiator 11.

The oil cooler 12 is provided between the cooling water control valve device 10 and the water pump 3. The cooling water flowing out from the water jacket 4 of the engine 2 flows to the oil cooler 12 via the cooling water control valve device 10 and returns to the engine 2. It is thereby possible to increase temperature of lubricating oil. As a result, it is possible to decrease viscosity of the lubricating oil, even when the ambient temperature is low. The cooling water control valve device 10 is capable of controlling the flow amount of the cooling water to the oil cooler 12.

The heater core 13 is provided between the cooling water control valve device 10 and the water pump 3 and in parallel to the oil cooler 12. The cooling water flowing out from the water jacket 4 of the engine 2 flows into the heater core 13 via the cooling water control valve device 10 and returns to the engine 2. It is thereby possible to increase by the heater core 13 temperature of a compartment of the vehicle. The cooling water control valve device 10 is capable of controlling the flow amount of the cooling water to the heater core 13.

In the present embodiment, it is possible to recirculate exhaust gas of the engine 2 into an intake side by the EGR valve device 14 and to carry out an EGR (Exhaust Gas Recirculation) operation for reducing density of nitrogen oxide. The EGR valve device 14 is capable of controlling a flow amount of the exhaust gas flowing through a passage, which connects an exhaust passage to an intake passage of the engine 2. The EGR valve device 14 is provided between the water jacket 4 of the engine 2 and the water pump 3. The cooling water flowing out from the water jacket 4 returns to the engine 2 via the EGR valve device 14. The EGR valve device 14 is thereby cooled down. The cooling water circulates through the water pump 3, the water jacket 4 and the EGR valve device 14 during an operation of the engine 2.

The throttle valve device 15 is provided to control an amount of intake air flowing through the intake passage (not shown). The throttle valve device 15 is provided between the cooling water control valve device 10 and the water pump 3 and in parallel to the oil cooler 12 and the heater core 13. The cooling water flowing out from the water jacket 4 of the engine 2 flows to the throttle valve device 15 via the cooling water control valve device 10 and returns to the engine 2. As a result, it is possible to warm the throttle valve device 15 even when the ambient temperature is low.

The reservoir tank 16 is provided in such a way that it is connected to the radiator 11. The cooling water is stored in the reservoir tank 16. When temperature of the cooling water in the radiator 11, that is, the temperature of the cooling water flowing through the engine cooling system 1 is increased and the cooling water is thereby expanded, the cooling water flows out from the radiator 11 to the reservoir tank 16 and it is stored therein. On the other hand, when the amount of the cooling water is decreased, the cooling water is supplied from the reservoir tank 16 to the radiator 11.

The cooling water control valve device 10 includes a housing unit 20, a valve unit 30, an electric motor 40, a valve seat unit 600, a spring 81 as a biasing member, and so on. The housing unit 20 includes a housing main body 21, a cover member 24, pipe units 25, 26 and 27, and so on. Each of the housing main body 21, the cover member 24 and the pipe units 25, 26 and 27 is made of, for example, resin.

Figure 3:
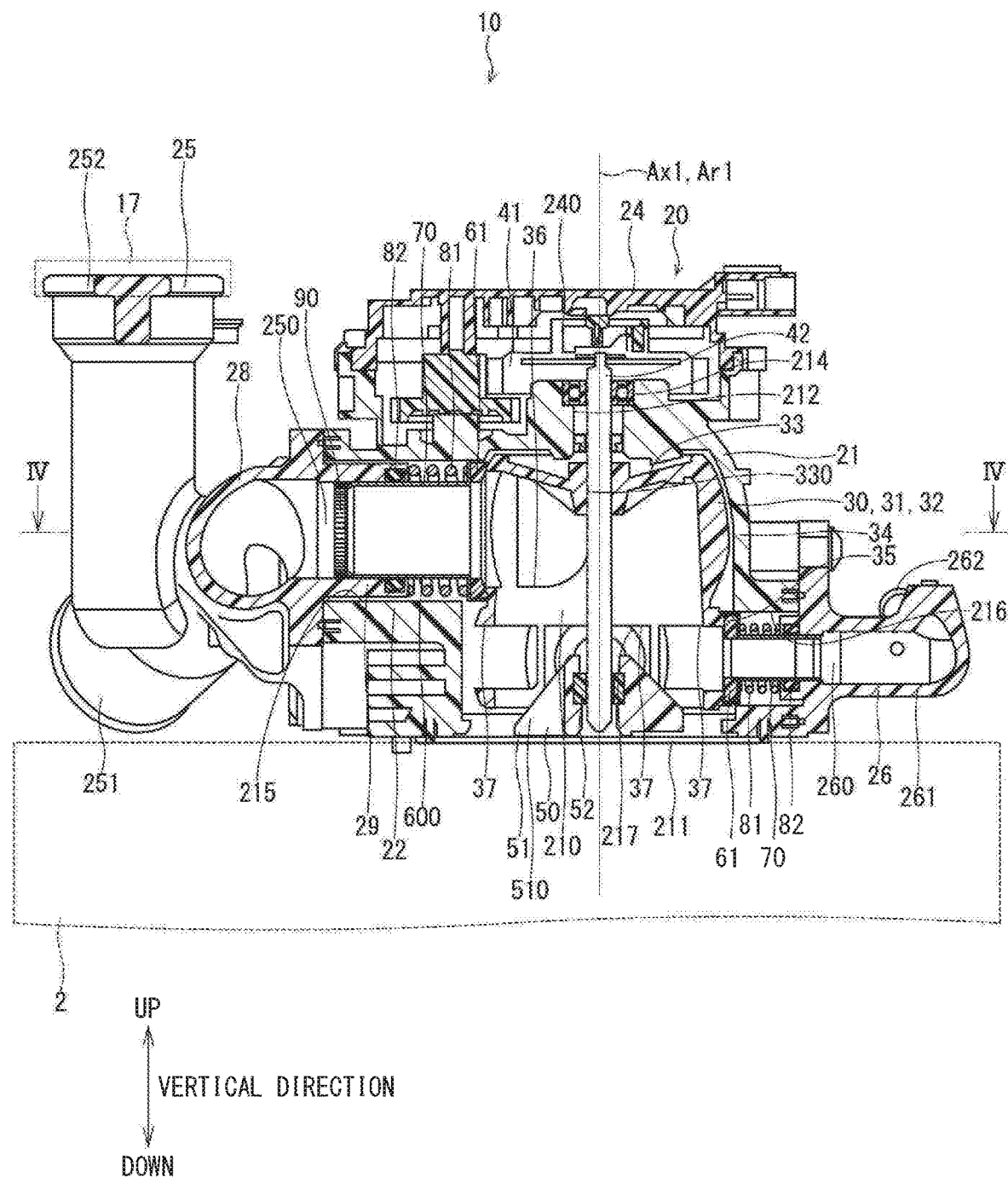
FIG. 3 is a schematic cross-sectional view taken along a line III-Ill in FIG. 2.

The housing main body 21 includes a valve accommodation space 210, a housing opened portion 211, a bearing hole 212, a bearing portion 50, a bearing portion 214, fluid passage holes 215, 216 and 217, a motor accommodation space 230 and so on. As shown in FIG. 3, the valve accommodation space 210 is formed as a space inside of the housing main body 21. The valve accommodation space 210 is formed in an almost cylindrical shape.

The housing opened portion 211 is formed at an outer wall of the housing main body 21. The housing opened portion 211 is formed to connect the valve accommodation space 210 to an outside of the housing main body 21. In other words, the valve accommodation space 210 is communicated to the outside of the housing main body 21 via the housing opened portion 211.

The cooling water control valve device 10 is mounted to the engine 2 so that the housing opened portion 211 of the housing main body 21 is connected to the water jacket 4. Therefore, the cooling water flows from the water jacket 4 into the valve accommodation space 210 via the housing opened portion 211. As above, the housing opened portion 211 is so formed that the valve accommodation space 210 is connected to the engine 2. The bearing portion 50 is formed in the housing opened portion 211.

The bearing hole 212 is formed in the housing main body 21 at a position opposite to the housing opened portion 211 across the valve accommodation space 210. The bearing hole 212 is formed in such a way that it connects the valve accommodation space 210 to an outside wall of the housing main body 21, which is located at a position opposite to the housing opened portion 211. The bearing hole 212 is coaxially formed with the valve accommodation space 210. The bearing portion 214 is provided in the bearing hole 212. Each of the fluid passage holes 215, 216 and 217 is so formed to connect the valve accommodation space 210 to the outside of the housing main body 21.

Figure 2:
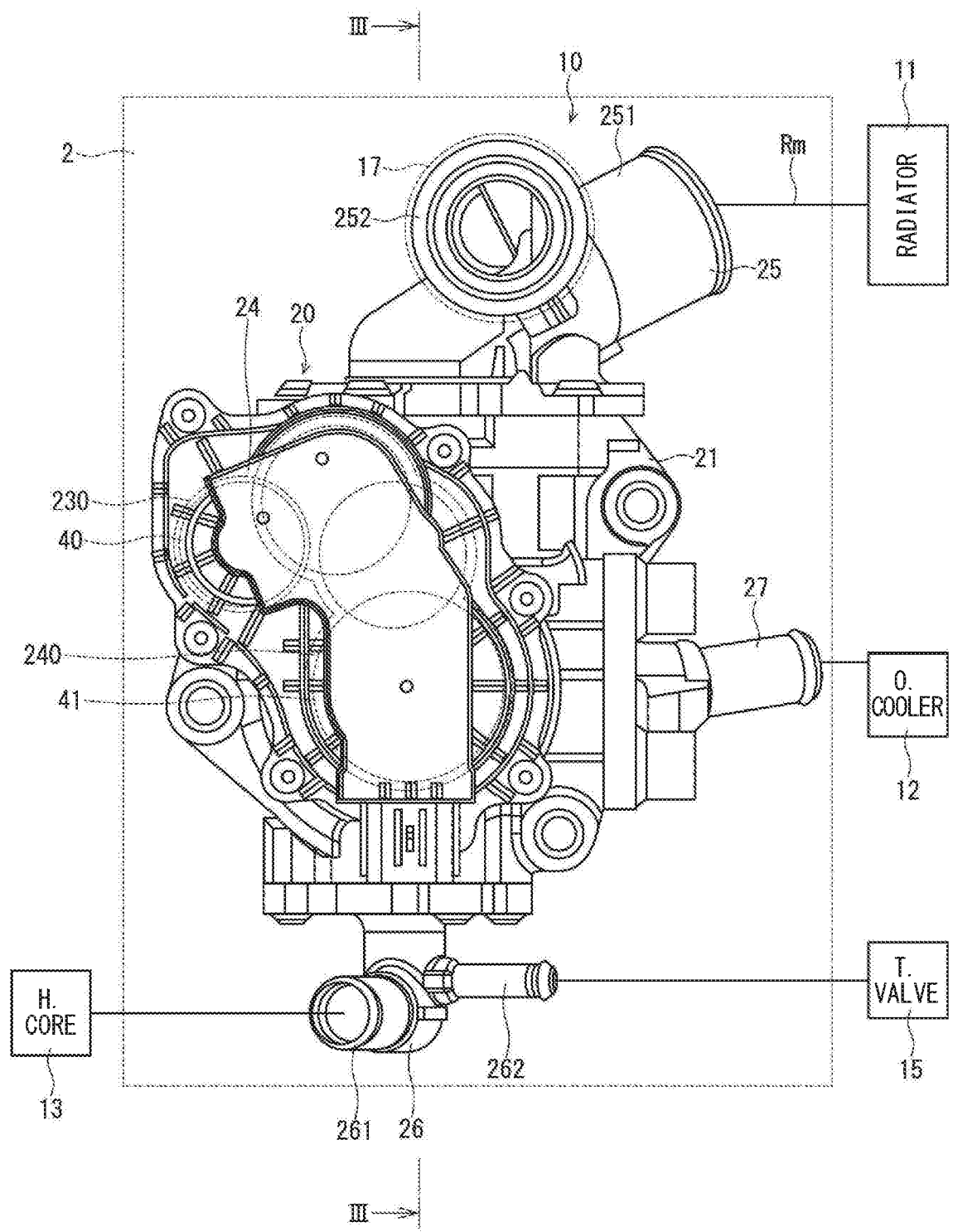
FIG. 2 is a schematic plan view showing the cooling water control valve device of the first embodiment.

The motor accommodation space 230 is formed as a space inside the housing main body 21 (FIG. 2).

The motor accommodation space 230 is formed in the housing main body 21 and opened at the outside wall of the housing main body 21, in which the bearing hole 212 is formed.

The cover member 24 is formed in a dish shape and provided to cover the housing main body 21 on a side of the bearing hole 212. The cover member 24 forms a gear accommodation space 240 together with the housing main body 21 and at a position between the cover member 24 and the housing main body 21. The gear accommodation space 240 is connected to the motor accommodation space 230.

The electric motor 40 is provided in the motor accommodation space 230. The electric motor 40 is driven to rotate when it receives electric power and outputs torque from its output portion. A gear unit 41 is provided in the gear accommodation space 240. The gear unit 41 is engaged with the output portion of the electric motor 40. In the present embodiment, the gear unit 41 forms a speed reduction portion. When the electric motor 40 is rotated, the torque outputted from the output portion is reduced by the gear unit 41 in its rotation.

The valve unit 30 includes a valve main body 31, ball shaped surfaces 34 and 35, valve opened portions 36 and 37 and so on. The valve main body 31 is made of, for example, resin. The valve main body 31 includes a valve cylindrical portion 32 and a valve bottom portion 33. The valve cylindrical portion 32 is formed in a cylindrical shape. The valve bottom portion 33 is integrally formed with the valve cylindrical portion 32 to close one of axial ends of the valve cylindrical portion 32. In other words, the valve main body 31 is formed in a cylindrical shape having a closed end.

The ball-shaped surface 34 is formed at an outer peripheral surface of the valve cylindrical portion 32 on an axial side closer to the valve bottom portion 33. Namely, the ball-shaped surface 34 is formed at a radial-outward peripheral surface of the valve main body 31. The ball-shaped surface 34 is formed in a convex spherical shape. The ball-shaped surface 35 is formed at the outer peripheral surface of the valve cylindrical portion 32 on an axial side of the ball-shaped surface 34, which is opposite to the valve bottom portion 33. The ball-shaped surface 35 is formed in a convex spherical shape. Each of the ball-shaped surfaces 34 and 35 corresponds to an outer wall surface of the valve main body 31.

A valve opened portion 36 is formed at the ball-shaped surface 34 in such a way that it connects an inner peripheral surface and the outer peripheral surface of the valve main body 31 with each other. The valve opened portion 36 is formed in an almost circular shape. Valve opened portions 37 are formed at the ball-shaped surface 35 in such a way that each of them connects the inner peripheral surface and the outer peripheral surface of the valve main body 31 with each other. Each of the valve opened portions 37 includes a window, which is formed in a rectangular shape.

The fluid passage hole 215 is formed in an inner wall of the housing main body 21 at a position opposing to the ball-shaped surface 34, wherein the inner wall of the housing main body 21 forms the valve accommodation space 210. Each of the fluid passage holes 216 and 217 is formed in the inner wall of the housing main body 21 at a position opposing to the ball-shaped surface 35.

A shaft insertion hole 330 is formed in the valve main body 31. The shaft insertion hole 330 is formed at a center of the valve bottom portion 33 in such a way that it passes through the valve bottom portion 33 in a thickness direction. A shaft 42 is provided in the shaft insertion hole 330 of the valve main body 31. The shaft 42 is made of, for example, metal and formed in a bar shape. The valve unit 30 and the shaft 42 are integrally formed so that they rotate together. In other words, each of the valve unit 30 and the shaft 42 is not rotatable relative to the other member.

One of axial ends of the shaft 42 is supported by the bearing portion 50. The other axial end of the shaft 42 is supported by the bearing portion 214. As above, the valve unit 30 is supported by the bearing portions 50 and 214 in such a way that the valve unit 30 is rotatable in the valve accommodation space 210 around an axis Ax1 of the valve unit 30. In other words, the valve unit 30 is rotatable around its axis.

The gear unit 41 is connected to the other axial end of the shaft 42. When the electric motor 40 is rotated and the torque is outputted from the output portion, the torque is transmitted to the shaft 42 via the gear unit 41. As a result, the valve main body 31 is rotated in the valve accommodation space 210 around a predetermined rotation-axis line Ar1. An overlapping area between the valve opened portion 36 and the fluid passage hole 215 is changed depending on a rotational position of the valve main body 31. Each of overlapping areas between the valve opened portion 37 and the fluid passage hole 216 and between the valve opened portion 37 and the fluid passage hole 217 is likewise changed depending on the rotational position of the valve main body 31.

The pipe unit 25 includes a first pipe portion 251 and a second pipe portion 252. The first pipe portion 251 is formed in a tubular shape. The second pipe portion 252 is divided from the first pipe portion 251 and formed in a tubular shape. The pipe unit 25 is connected to the housing main body 21 in such a way that one end of the first pipe portion 251 is located inside of the fluid passage hole 215 (FIG. 3). According to the above structure, an inside space of the first pipe portion 251 is connected to the valve accommodation space 210. A fluid passage portion 250 is formed inside of the first pipe portion 251. The fluid passage portion 250 operatively connects the valve accommodation space 210 to the outside.

The other end of the first pipe portion 251 of the pipe unit 25, which is opposite to the one end connected to the housing main body 21, is connected to the radiator 11 via the main fluid passage Rm. A cap 17 is provided at one end of the second pipe portion 252, which is opposite to the other end thereof connected to the first pipe portion 251. The cap 17 is provided to cover the one end of the second pipe portion 252, which is opposite to the other end thereof connected to the first pipe portion 251. When the cooling water in the engine cooling system 1 becomes insufficient, the cap 17 is opened and the cooling water can be supplied via the second pipe portion 252.

The pipe unit 26 includes a first pipe portion 261 and a second pipe portion 262. The first pipe portion 261 is formed in a tubular shape. The second pipe portion 262 is divided from the first pipe portion 261 and formed in a tubular shape. The pipe unit 26 is connected to the housing main body 21 in such a way that one end of the first pipe portion 261 is located inside of the fluid passage hole 216 (FIG. 3). According to the above structure, an inside space of the first pipe portion 261 is connected to the valve accommodation space 210. A fluid passage portion 260 is formed inside of the first pipe portion 261. The fluid passage portion 260 operatively connects the valve accommodation space 210 to the outside. The other end of the first pipe portion 261 of the pipe unit 26, which is opposite to the one end thereof connected to the housing main body 21, is connected to the heater core 13. One end of the second pipe portion 262, which is opposite to the other end thereof connected to the first pipe portion 261, is connected to the throttle valve device 15.

The pipe unit 27 is formed in a tubular shape. The pipe unit 27 is connected to the housing main body 21 in such a way that one end of the pipe unit 27 is located inside of the fluid passage hole 217. According to the above structure, an inside space of the pipe unit 27 is connected to the valve accommodation space 210. The other end of the pipe unit 27, which is opposite to the one end connected to the housing main body 21, is connected to the oil cooler 12.

The valve seat unit 600 includes a valve seat member 61, a sleeve 70 and so on. The valve seat member 61 is formed in an annular shape and made of, for example, fluorine resin, friction coefficient of which is smaller than a predetermined value. The valve seat member 61 is provided at each of positions respectively corresponding to the fluid passage holes 215 and 216, each of which is opened to the valve accommodation space 210. The valve seat member 61 for the fluid passage hole 215 is provided in such a way that one of axial ends thereof is in contact with the ball-shaped surface 34. The valve seat member 61 for the fluid passage hole 216 is provided in such a way that one of axial ends thereof is in contact with the ball-shaped surface 35.

The sleeve 70 is made of, for example, metal and formed in a cylindrical shape. The sleeve 70 is provided in each of the fluid passage holes 215 and 216. In the sleeve 70 provided in the fluid passage hole 215, one of axial ends holds the valve seat member 61, while the other axial end is located at a position inside of the one end of the first pipe portion 251, which is connected to the housing main body 21. An outer peripheral surface of the sleeve 70 is positioned in a radial direction by an inner peripheral surface of the one end of the first pipe portion 251 on a side closer to the housing main body 21. The sleeve 70 is movable in a reciprocal manner in an axial direction of the first pipe portion 251.

In the sleeve 70 provided in the fluid passage hole 216, one of axial ends holds the valve seat member 61, while the other axial end is located at a position inside of one end of the first pipe portion 261, on a side closer to the housing main body 21. An outer peripheral surface of the sleeve 70 is positioned in a radial direction by an inner peripheral surface of the one end of the first pipe portion 261 on the side closer to the housing main body 21. The sleeve 70 is movable in a reciprocal manner in an axial direction of each of the first pipe portion 261 and the first pipe portion of the pipe unit 27.

The spring 81 is composed of, for example, a coil spring. The spring 81 is provided in each of the fluid passage holes 215 and 216. The spring 81 provided in the fluid passage hole 215 is located at a radial outside of the sleeve 70. One end of the spring 81 is in contact with an axial end of the sleeve 70 on a side closer to the valve seat member 61. The other end of the spring 81 is in contact with the one end of the first pipe portion 251 on the side closer to the housing main body 21. The spring 81 has an expansion force extendable in the axial direction. Therefore, the spring 81 biases the sleeve 70 and the valve seat member 61 in a direction to the valve unit 30. One of the axial end surfaces of the vale seat member 61 is thereby pushed to the ball-shaped surface 34.

The spring 81 provided in the fluid passage hole 216 is located at a radial outside of the sleeve 70. One end of the spring 81 is in contact with an axial end of the sleeve 70 on a side closer to the valve seat member 61. The other end of the spring 81 is in contact with the one end of the first pipe portion 261 on the side closer to the housing main body 21. The spring 81 has an expansion force extendable in the axial direction. Therefore, the spring 81 biases the sleeve 70 and the valve seat member 61 in a direction to the valve unit 30. One of the axial end surfaces of the vale seat member 61 is thereby pushed to the ball-shaped surface 35.

In the present embodiment, the cooling water which passes through the water jacket 4 of the engine and temperature of which is thereby increased flows into an inside and an outside of the valve main body 31 in the valve accommodation space 210 via the housing opened portion 211 of the housing main body 21. The cooling water flowing into the inside of the valve main body 31 in the valve accommodation space 210 flows to the first pipe portion 251, wherein an amount of the cooling water depends on an overlapping area between the valve opened portion 36 and an opened portion of the valve seat member 61 (that is, the fluid passage portion 250) and the overlapping area varies in accordance with the rotational position of the valve main body 31. The cooling water flowing into the first pipe portion 251 is supplied to the radiator 11. The temperature of the cooling water is decreased when it passes through the radiator 11. The cooling water, the temperature of which is decreased by the radiator 11, returns to the engine 2 to cool down the engine 2.

When the overlapping area between the valve opened portion 36 and the fluid passage portion 250 is zero, namely when the opened portion of the valve seat member 61 is entirely closed by the ball-shaped surface 34, flow of the cooling water is shut off between the inside of the valve main body 31 and the fluid passage portion 250. The above condition is referred to as "a valve fully closed condition". A position of the valve unit 30, at which the overlapping area between the valve opened portion 36 and the opened portion of the valve seat member 61 (that is, the fluid passage portion 250) is changed from zero to a value larger than zero, is referred to as "an opening start position of the valve unit 30".

As above, the valve unit 30 is capable of controlling the amount of the cooling water flowing from the housing opened portion 211 to the fluid passage portion 250 depending on the rotational position thereof. The rotational position of the valve unit 30 is controlled by a control unit (not shown), which controls a driving operation of the electric motor 40.

In addition, the cooling water flowing into the inside of the valve main body 31 in the valve accommodation space 210 flows to the first pipe portion 261 and the second pipe portion 262, wherein an amount of the cooling water depends on an overlapping area between the valve opened portion 37 and an opened portion of the valve seat member 61 (that is, the fluid passage portion 260) and the overlapping area varies in accordance with the rotational position of the valve main body 31. The cooling water flowing into the first pipe portion 261 and the second pipe portion 262 is respectively supplied to the heater core 13 and the throttle valve device 15.

Furthermore, the cooling water flowing into the inside of the valve main body 31 in the valve accommodation space 210 flows to the pipe unit 27, wherein an amount of the cooling water depends on an overlapping area between the valve opened portion 37 and the fluid passage hole 217 and the overlapping area varies in accordance with the rotational position of the valve main body 31. The cooling water flowing into the pipe unit 27 is supplied to the oil cooler 12.

The valve unit 30 is formed in a cylindrical shape having the valve opened portion 36, which connects the space on an inner surface side to the space on an outer surface side. The valve opened portion 36 of the valve unit 30 is connected to the housing opened portion 211 in the axial direction of the valve unit 30. The valve unit 30 is rotatable around the axis Ax1. The overlapping area between the valve opened portion 36 and the fluid passage portion 250 is changed depending on the rotational position of the valve unit 30, so that the flow amount of the cooling water flowing from the housing opened portion 211 to the fluid passage portion 250 can be controlled. As above, in the cooling water control valve device 10, the rotational position of the valve unit 30 is controlled by the rotation of the electric motor 40, so that the amount of the cooling water returning to the engine 2 via the radiator 11 as well as the amount of the cooling water flowing through each of the heater core 13, the throttle valve device 15 and the oil cooler 12 is controlled.

Figure 4:
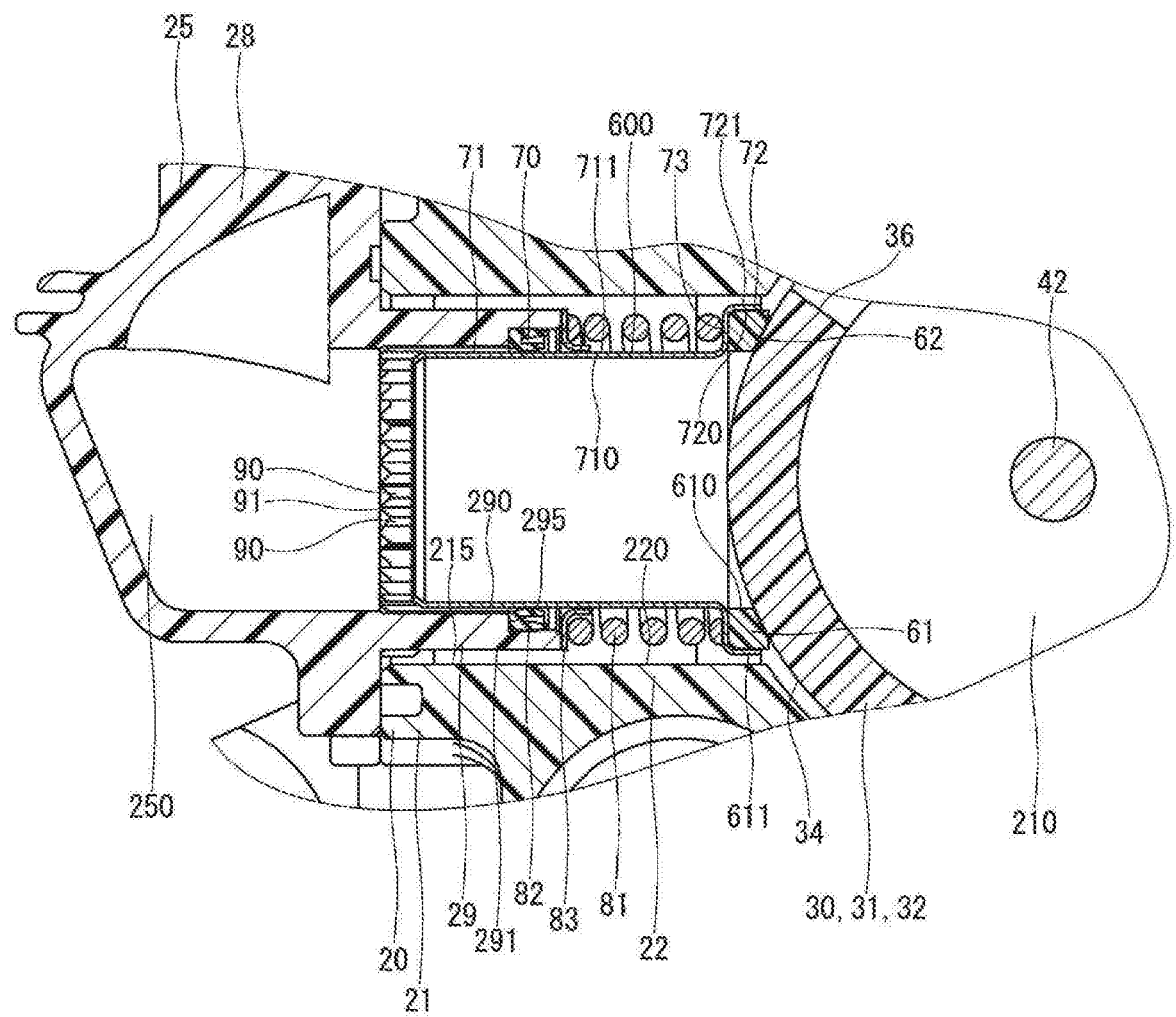
FIG. 4 is a schematic cross-sectional view showing a valve seat unit and its related parts and components of the cooling water control valve device of the first embodiment.

Now, the pipe unit 25, the valve seat unit 600 and their surrounding structures will be explained in detail. As shown in FIG. 4, the pipe unit 25 includes a pipe main body 28 and a pipe cylindrical portion 29. The pipe main body 28 is located at a position outside of the housing main body 21 and forms the first pipe portion 251 and the second pipe portion 252. The pipe cylindrical portion 29 is integrally formed with the pipe main body 28 in such a way that it is formed in the cylindrical shape and extending through the fluid passage hole 215 in a direction from the pipe main body 28 on a side closer to the housing main body 21 to the valve unit 30. An inside space of the pipe cylindrical portion 29 is communicated to an inside space of the first pipe portion 251. The pipe cylindrical portion 29 is also referred to as "a cylindrical passage member" of the housing unit. In other words, the housing unit 20 includes the pipe cylindrical portion 29 as the cylindrical passage member, through which the cooling water flows.

In the present embodiment, the housing unit 20 includes a housing cylindrical portion 22. The housing cylindrical portion 22 is formed in the housing main body 21 at a radial-outside position of the pipe cylindrical portion 29. The housing cylindrical portion 22 is formed in a cylindrical shape, wherein an inner peripheral surface 220 thereof forms the fluid passage hole 215. An annular space is formed between the inner peripheral surface 220 of the housing cylindrical portion 22 and an outer peripheral surface 291 of the pipe cylindrical portion 29.

The sleeve 70 of the valve seat unit 600 includes a first cylindrical portion 71, a step portion 73 and a second cylindrical portion 72. The first cylindrical portion 71 is formed in a cylindrical shape. The step portion 73 is integrally formed with the first cylindrical portion 71 in such a way that it is formed in an annular shape and extending in a radial-outward direction from one of axial ends of the first cylindrical portion 71. The other axial end of the first cylindrical portion 71 is formed in a tapered shape in such an inclined manner that it extends in a radial-inward direction. The second cylindrical portion 72 is integrally formed with the step portion 73 in such a way that it is formed in a cylindrical shape and extending from an outer periphery of the step portion 73 in a direction opposite to the first cylindrical portion 71. An outer diameter of the second cylindrical portion 72 is larger than that of the first cylindrical portion 71.

The sleeve 70 is provided in such a way that the other axial end of the first cylindrical portion 71 is located at a position inside of the pipe cylindrical portion 29. The outer diameter of the first cylindrical portion 71 is slightly smaller than an inner diameter of the pipe cylindrical portion 29. Therefore, the first cylindrical portion 71 is capable of moving in a reciprocal manner, wherein an outer peripheral surface 711 of the first cylindrical portion 71 is positioned by an inner peripheral surface 290 of the pipe cylindrical portion 29 in a radial direction of the pipe cylindrical portion 29. The first cylindrical portion 71 corresponds to "a positioned member". A predetermined clearance is formed between the outer peripheral surface 711 of the first cylindrical portion 71 and the inner peripheral surface 290 of the pipe cylindrical portion 29, wherein variation of the component tolerance is taken into consideration to suppress variation of the opening start position of the valve unit 30.

The sleeve 70 is provided in such a way that the second cylindrical portion 72 is located at a position inside of an end of the housing cylindrical portion 22 on a side closer to the valve unit 30. An outer diameter of the second cylindrical portion 72 is smaller than an inner diameter of the end of the housing cylindrical portion 22 on the side closer to the valve unit 30. Accordingly, an annular space is formed between an outer peripheral surface 721 of the second cylindrical portion 72 and the inner peripheral surface 220 of the housing cylindrical portion 22. The second cylindrical portion 72 is movable in the axial direction in the reciprocal manner without a sliding contact between the outer peripheral surface 721 and the inner peripheral surface 220 of the housing cylindrical portion 22. The outer peripheral surface 721 of the second cylindrical portion 72 may be occasionally brought into contact with the inner peripheral surface 220 of the housing cylindrical portion 22.

The valve seat member 61 is provided at an inside of the second cylindrical portion 72 on a side of the step portion 73 of the sleeve 70, which is closer to the valve unit 30. An outer peripheral surface 611 of the valve seat member 61 is in contact with an inner peripheral surface of the second cylindrical portion 72, so that the valve seat member 61 is supported by the second cylindrical portion 72.

A valve seat surface 62 is formed at one of axial ends of the valve seat member 61, that is, at the axial end thereof on the side closer to the valve unit 30. In other words, the valve seat surface 62 is formed on one of the axial sides of the sleeve 70 in the axial direction of the first cylindrical portion 71. The valve seat surface 62 is formed in a concave spherical surface and fluid tightly in contact with the ball-shaped surface 34 of the valve unit 30.

A step portion 295, which extends in a circular pattern in a radial-outward direction from the inner peripheral surface 290, is formed at an end of the pipe cylindrical portion 29 on a side closer to the valve unit 30. A seal element 82 made of rubber is provided at the step portion 295 on the side closer to the valve unit 30. The seal element 82 is formed in an annular shape and capable of sliding in a condition that an inner peripheral surface thereof is fluid tightly in contact with the outer peripheral surface 711 of the first cylindrical portion 71. It is thereby possible to hold a fluid tight condition between the seal element 82 and the first cylindrical portion 71 of the sleeve 70.

A spring holding member 83 made of metal is provided at an axial end of the pipe cylindrical portion 29 on the side closer to the valve unit 30. The spring holding member 83 is formed in an annular shape and one of surfaces thereof is in contact with the axial end of the pipe cylindrical portion 29 on the side closer to the valve unit 30.

One end of the spring 81 is in contact with a surface of the step portion 73 of the sleeve 70, which is opposite to a surface on the side closer to the valve unit 30. The other end of the spring 81 is in contact with a surface of the spring holding member 83 on the side closer to the valve unit 30. The spring 81 thereby biases the valve seat member 61 in the direction to the valve unit 30 via the step portion 73 of the sleeve 70. The valve seat surface 62 is pushed to the ball-shaped surface 34 of the valve unit 30.

When the valve unit 30 is rotated around its axis by the rotational movement of the electric motor 40, the valve seat surface 62 slides on the ball-shaped surface 34 and rotates relative to the ball-shaped surface 34 in a circumferential direction of the valve main body 31. During this operation, the valve seat surface 62 of the valve seat unit 600 is aligned to the ball-shaped surface 34, in a condition that the outer peripheral surface 711 of the first cylindrical portion 71 is in contact with the inner peripheral surface 290 of the pipe cylindrical portion 29. In the above alignment, the outer peripheral surface 711 of the first cylindrical portion 71 occasionally slides on the inner peripheral surface 290 of the pipe cylindrical portion 29. In addition, even when the ball-shaped surface 34 is moved in a radial-inward or a radial-outward direction of the valve main body 31, the sleeve 70 biased by the spring 81 moves in its axial direction in the reciprocal manner. Therefore, the fluid tight contact between the valve seat surface 62 and the ball-shaped surface 34 can be maintained.

Figure 5:
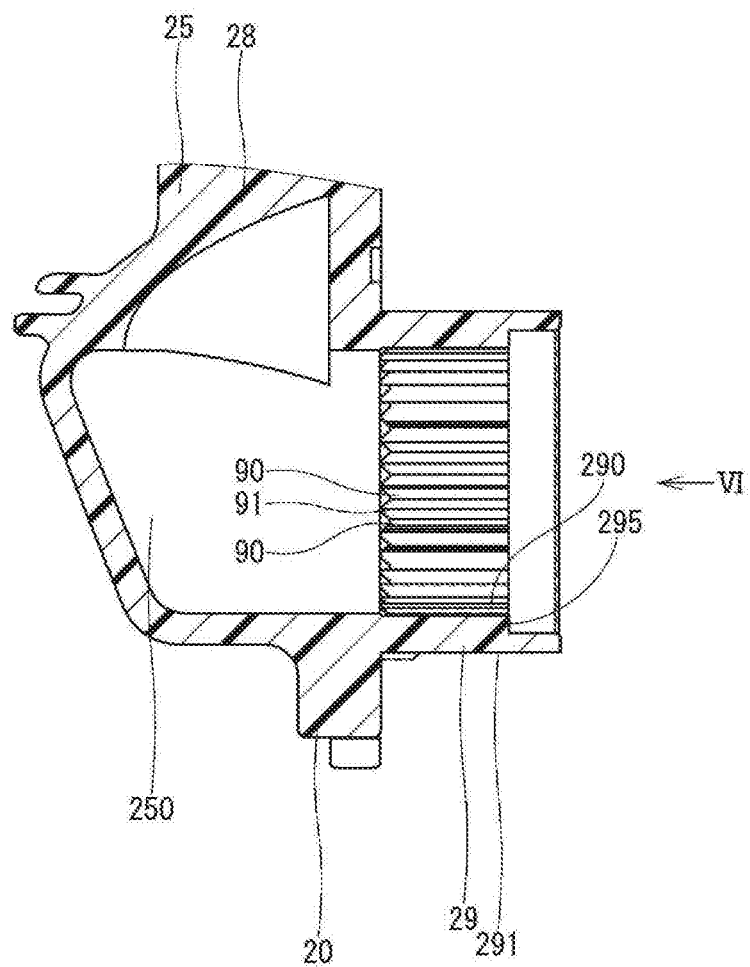
FIG. 5 is a schematic cross-sectional view showing a cylindrical passage member of a housing according to the cooling water control valve device of the first embodiment.
Figure 6:
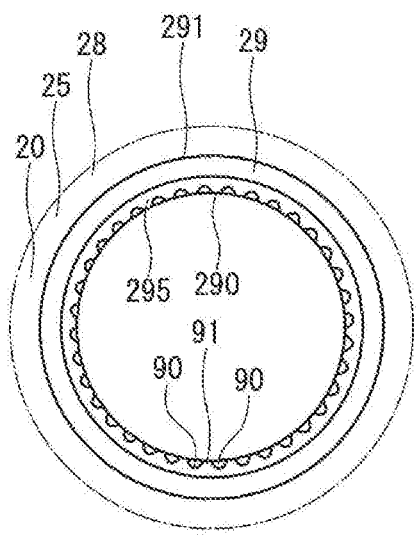
FIG. 6 is a schematic view of the cylindrical passage member when viewed it in a direction of VI in FIG. 5.

In the present embodiment, the pipe cylindrical portion 29 has multiple grooves 90. As shown in FIGS. 4 to 6, each of the grooves 90 is recessed in a radial-outward direction from the inner peripheral surface 290 of the pipe cylindrical portion 29. The groove 90 straightly extends in the inner peripheral surface 290 from the step portion 295 to the pipe main body 28 (FIG. 5). In other words, the grooves 90 are formed at least in a part of the inner peripheral surface 290, at which the pipe cylindrical portion 29 and the first cylindrical portion 71 overlap each other in the axial direction (FIG. 4). The multiple grooves 90 are formed at equal intervals in a circumferential direction of the pipe cylindrical portion 29 (FIG. 6).

Figure 7:
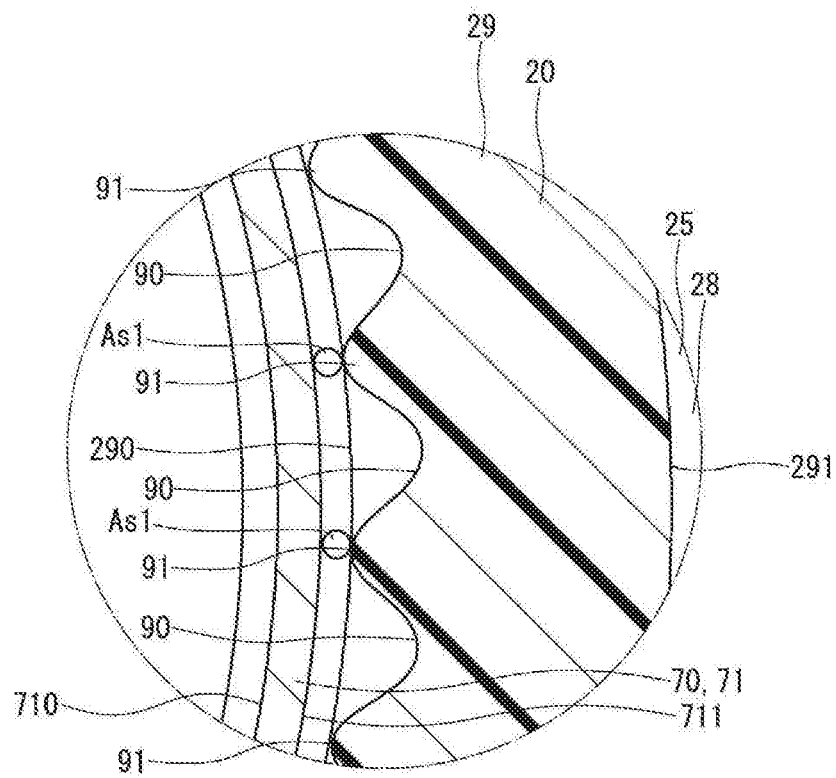
FIG. 7 is a schematic cross-sectional view showing concave portions and their related portions of the cooling water control valve device of the first embodiment.

As shown in FIG. 7, neighboring two grooves 90 of the multiple grooves 90 are connected to each other in the circumferential direction of the pipe cylindrical portion 29 to form a connecting portion 91. In the present embodiment, each of the multiple grooves 90 forms the connecting portion 91 with the neighboring groove 90. A profile of the connecting portion 91 on a cross-sectional plane perpendicular to an axis of the pipe cylindrical portion 29 is formed in a curved shape, which is protruded in a radial-inward direction of the pipe cylindrical portion 29 (FIG. 7). The inner peripheral surface 290 is formed on each center of the connecting portions 91, namely, on each boundary between the neighboring grooves 90. As above, in the present embodiment, a wall surface is formed in such a way that the wall surface is continuously connected from a bottom of the groove 90 to a bottom of the neighboring groove 90 via the connecting portion 91 and the inner peripheral surface 290.

When each part of the engine 2 is made by a casting mold, casting sand may be contained in the cooling water, which passes through the engine 2 and flows into the cooling water control valve device 10. When the cooling water contains the casting sand, the casting sand may enter the clearance between the outer peripheral surface 711 of the first cylindrical portion 71 of the sleeve 70 and the inner peripheral surface 290 of the pipe cylindrical portion 29. Then, the alignment of the valve seat surface 62 may not be properly done. In the present embodiment, the above problem is overcome by forming the grooves 90 in the inner peripheral surface 290 of the pipe cylindrical portion 29.

Figure 8:
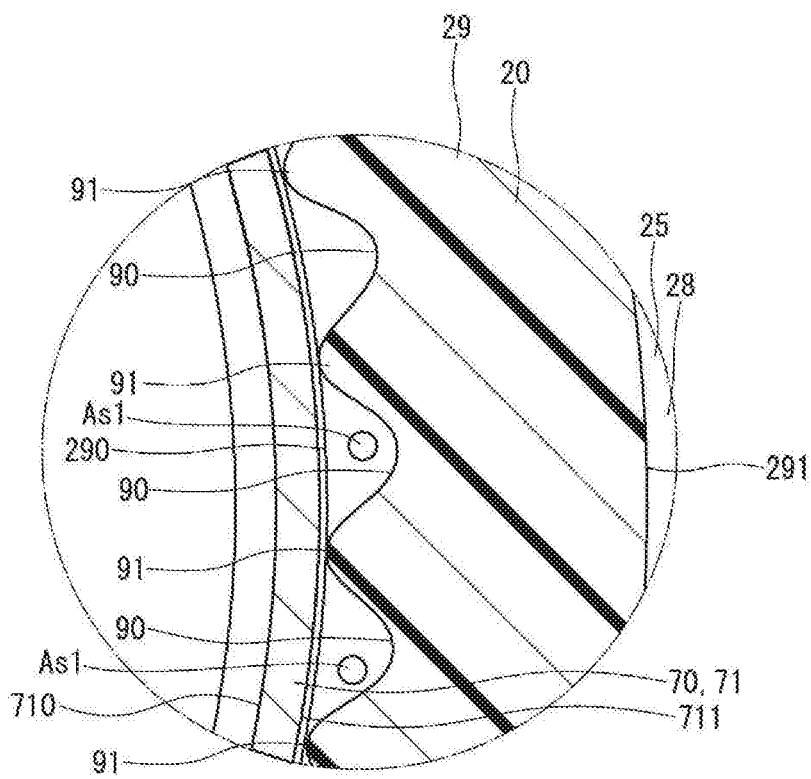
FIG. 8 is a schematic cross-sectional view showing the concave portions and their related portions of the cooling water control valve device of the first embodiment in a condition different from that of FIG. 7.

In the present embodiment, as shown in FIG. 7, even when extraneous material Asl enters the clearance between the outer peripheral surface 711 of the first cylindrical portion 71 of the sleeve 70 and the inner peripheral surface 290 of the pipe cylindrical portion 29, it is possible to let the extraneous material Asl to escape into the grooves 90, as shown in FIG. 8. It is thereby possible to suppress alignment failure of the valve seat surface 62, which may be caused by the extraneous material Asl entering the clearance between the sleeve 70 and the pipe cylindrical portion 29. The extraneous material Asl, which escaped to the grooves 90, is discharged to the side of the pipe main body 28 from the end of the grooves 90 opposite to the step portion 295 (FIG. 4).

Now, a structure of the bearing portion 50 will be explained in detail.

Figure 9:
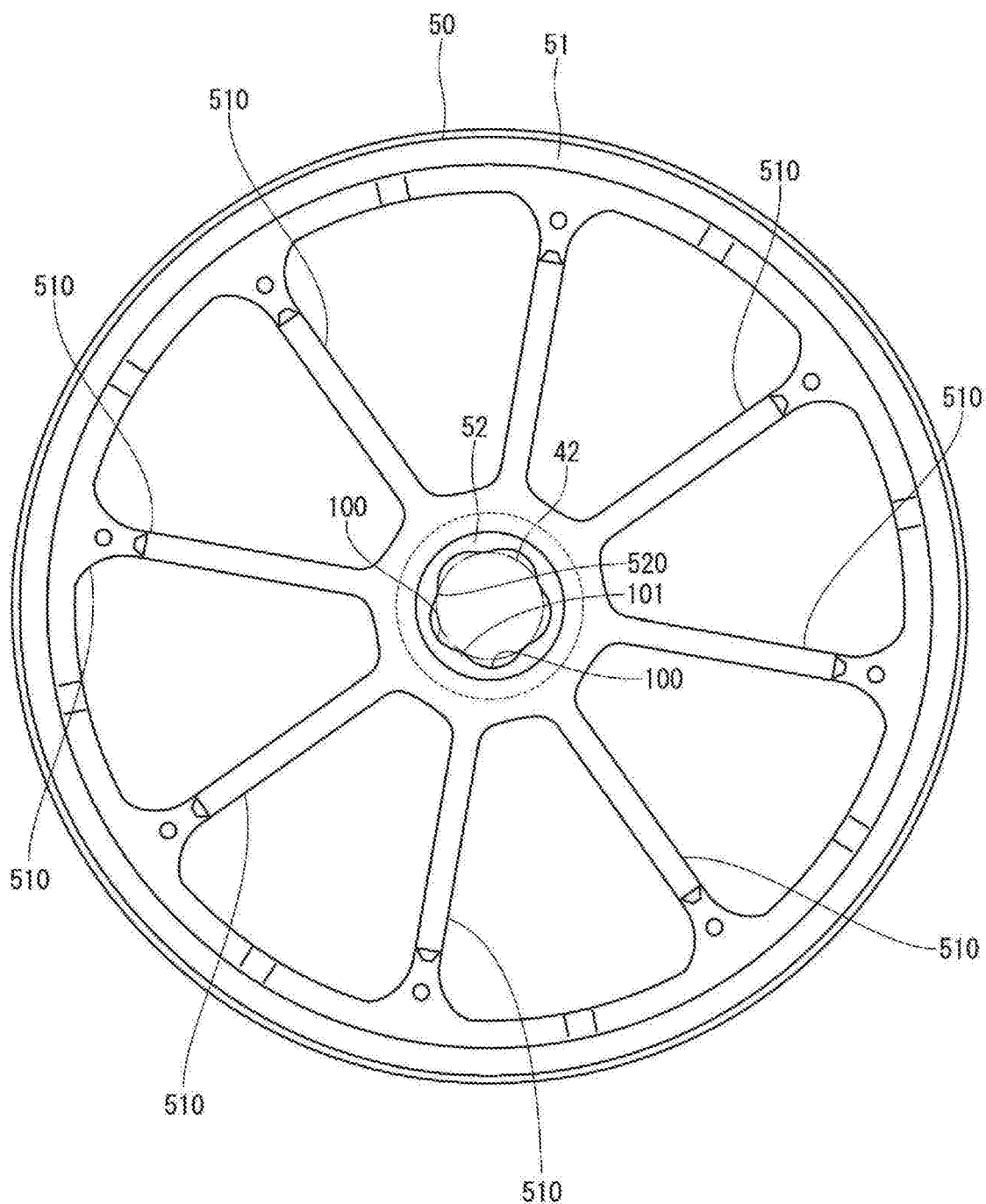
FIG. 9 is a schematic plan view showing a bearing portion of the cooling water control valve device of the first embodiment.

As shown in FIG. 9, the bearing portion 50 includes a plate member 51 and a bearing member 52. The plate member 51 is made of, for example, resin and formed in a disc shape. Multiple plate hole portions 510, each of which has a fan shape, are formed in the plate member 51. Eight plate hole portions 510 are formed at equal intervals in a circumferential direction of the plate member 51. The cooling water, which will enter the valve accommodation space 210 via the housing opened portion 211 of the housing unit 20, passes through the plate hole portions 510 and flows into the valve unit 30.

The bearing member 52 is made of, for example, fluorine resin and formed in a cylindrical shape. The bearing member 52 is formed at a center of the plate member 51. The bearing member 52 is integrally formed with the plate member 51, for example, by an insert molding process. An inner peripheral surface 520 of the bearing portion 52 supports the shaft 42. Namely, an outer peripheral surface of the shaft 42 is capable of sliding on the inner peripheral surface 520 of the bearing portion 52.

In the present embodiment, multiple recessed portions 100 are formed in the bearing member 52. Each of the recessed portions 100 is formed in such a way that it is recessed in a radial-outward direction from the inner peripheral surface 520 of the bearing member 52. Each of the recessed portions 100 is formed in the inner peripheral surface 520 in such a way that it straightly extends from one of axial ends of the bearing member 52 to the other axial end. Five recessed portions 100 are formed at equal intervals in a circumferential direction of the bearing member 52 (FIG. 9).

As shown in FIG. 9, neighboring two recessed portions 100 of the multiple recessed portions 100 are connected to each other in the circumferential direction of the bearing member 52 to form a connecting portion 101. In the present embodiment, each of the multiple recessed portions 100 forms the connecting portion 101 with the neighboring recessed portion 100. A profile of the connecting portion 101 on a cross-sectional plane perpendicular to an axis of the bearing member 52 is formed in a curved shape, which is protruded in a radial-inward direction of the bearing member 52. The inner peripheral surface 520 is formed on each center of the connecting portions 101, namely, on each boundary between the neighboring recessed portions 100. As above, in the present embodiment, a wall surface is formed in such a way that the wall surface is smoothly and continuously connected from a bottom of the recessed portion 100 to a bottom of the neighboring recessed portion 100 via the connecting portion 101 and the inner peripheral surface 520.

As explained above, the cooling water passing through the engine 2 and flowing into the cooling water control valve device 10 may contain the casting sand. When the casting sand is contained in the cooling water, the casting sand may enter the clearance between the outer peripheral surface of the shaft 42 and the inner peripheral surface 520 of the bearing member 52. Then, a shaft supporting failure of the bearing member 52 for the shaft 42 may occur. In the present embodiment, the above failure is overcome by forming the recessed portions 100 in the inner peripheral surface 520 of the bearing member 52.

In the present embodiment, since the recessed portions 100 are formed in the inner peripheral surface 520 of the bearing member 52, the extraneous material, such as, the casting sand, can escape to the recessed portions 100, even when the extraneous material enters the clearance between the outer peripheral surface of the shaft 42 and the inner peripheral surface 520 of the bearing member 52. Accordingly, it is possible to suppress a bearing failure for supporting the shaft 42, which may be caused by the extraneous material entering the clearance between the outer peripheral surface of the shaft 42 and the inner peripheral surface 520 of the bearing member 52. The extraneous material, which escaped to the recessed portions 100, flows along the recessed portions 100 and it is discharged to the space of the valve unit 30.

As explained above, the cooling water control valve device 10 of the present embodiment is capable of controlling the flow of the cooling water passing through the engine 2 and includes the housing unit 20, the valve unit 30, the valve seat unit 600 and the spring 81. The housing unit 20 includes the pipe cylindrical portion 29 as the cylindrical passage member, through which the cooling water flows. The valve unit 30 includes the valve main body 31 rotatable around the axis and the valve opened portion 36, which is formed at the ball-shaped surface 34 (that is, the outer peripheral surface of the valve main body 31) and through which the cooling water passes. The valve seat unit 600 includes the first cylindrical portion 71 as the positioned member of the cylindrical shape, wherein the outer peripheral surface 711 is positioned by the inner peripheral surface 290 of the pipe cylindrical portion 29 in the radial direction and the first cylindrical portion 71 is movable in the axial direction in the reciprocal manner. The valve seat unit 600 further includes the valve seat surface 62 of the annular shape to hold the fluid tight condition between the valve seat surface 62 and the valve main body 31, when the valve seat surface 62 is in contact with the ball-shaped surface 34 of the valve main body 31 on the axial side of the first cylindrical portion 71. The spring 81 is capable of biasing the valve seat unit 600 in such a way that the valve seat surface 62 is pushed to the ball-shaped surface 34 of the valve main body 31. The pipe cylindrical portion 29 of the housing unit 20 includes the grooves 90, which are formed at least in the part of the overlapping area in the axial direction between the pipe cylindrical portion 29 and the first cylindrical portion 71, wherein each of the grooves 90 is recessed in the radial-outward direction.

In the present embodiment, the outer peripheral surface 711 of the first cylindrical portion 71 is positioned in the radial direction by the inner peripheral surface 290 of the pipe cylindrical portion 29 of the housing unit 20 and the valve seat unit 600 is movable in the axial direction in the reciprocal manner. Therefore, the positioning accuracy and aligning accuracy of the valve seat surface 62 to the valve main body 31 in the radial direction can be increased and thereby it becomes possible to stabilize the opening start position of the valve unit 30. In addition, the pipe cylindrical portion 29 of the housing unit 20 includes the grooves 90, which are formed at least in the part of the axially overlapping portion of the pipe cylindrical portion 29 with the first cylindrical portion 71 in such a way that each of the grooves 90 is recessed in the radial-outward direction from the inner peripheral surface 290. As a result, even when the extraneous material enters the space between the inner peripheral surface 290 of the pipe cylindrical portion 29 and the outer peripheral surface 711 of the first cylindrical portion 71 of the valve seat unit 600, it is possible to make the extraneous material to escape to the grooves 90 of the pipe cylindrical portion 29. Therefore, it is possible to avoid the alignment failure of the valve seat surface 62 and to suppress leakage of the cooling water during the valve fully-closed condition by the valve seat unit 600.

In addition, in the present embodiment, the multiple grooves 90 are formed in the circumferential direction. At least two of the multiple grooves 90 are connected to each other in the circumferential direction of the pipe cylindrical portion 29 to form the connecting portion 91. The profile of the connecting portion 91 on the cross-sectional plane perpendicular to the axis of the pipe cylindrical portion 29 is formed in the curved shape, which is protruded in the radial-inward direction of the pipe cylindrical portion 29. Therefore, even when the extraneous material enters the space between the outer peripheral surface 711 of the first cylindrical portion 71 and the connecting portion 91 of the grooves 90, it is possible to make the extraneous material to easily escape to the bottom side.

In addition, in the present embodiment, the multiple grooves 90 are formed at equal intervals in the circumferential direction. Difference of linear expansion may occur between the pipe cylindrical portion 29 and the sleeve 70 due to a material difference. As a result, the clearance between the inner peripheral surface 290 of the pipe cylindrical portion 29 and the outer peripheral surface 711 of the first cylindrical portion 71 may become smaller due to an increase or decrease of the ambient temperature. Then, the extraneous material may easily enter the clearance and the extraneous material may be easily caught by the clearance. In a case that the multiple grooves 90 are formed at un-equal intervals in the circumferential direction of the pipe cylindrical portion 29, the extraneous material may be more easily caught by the clearances of the multiple grooves 90 arranged in the circumferential direction, in particular, by the clearance having a larger interval. When the above material catch of the extraneous material occurs in different manners from the groove to the groove in the circumferential direction of the pipe cylindrical portion 29, the alignment accuracy of the valve seat surface 62 may be decreased or the alignment failure may occur.

However, in the present embodiment, the multiple grooves 90 are formed at equal intervals in the circumferential direction of the pipe cylindrical portion 29. It is thereby possible to suppress circumferential differences in the occasions, in which the material catch of the extraneous material occurs. Therefore, it is possible to suppress the decrease of the alignment accuracy of the valve seat surface 62 and the occurrence of the alignment failure.

Second Embodiment

Figure 10:
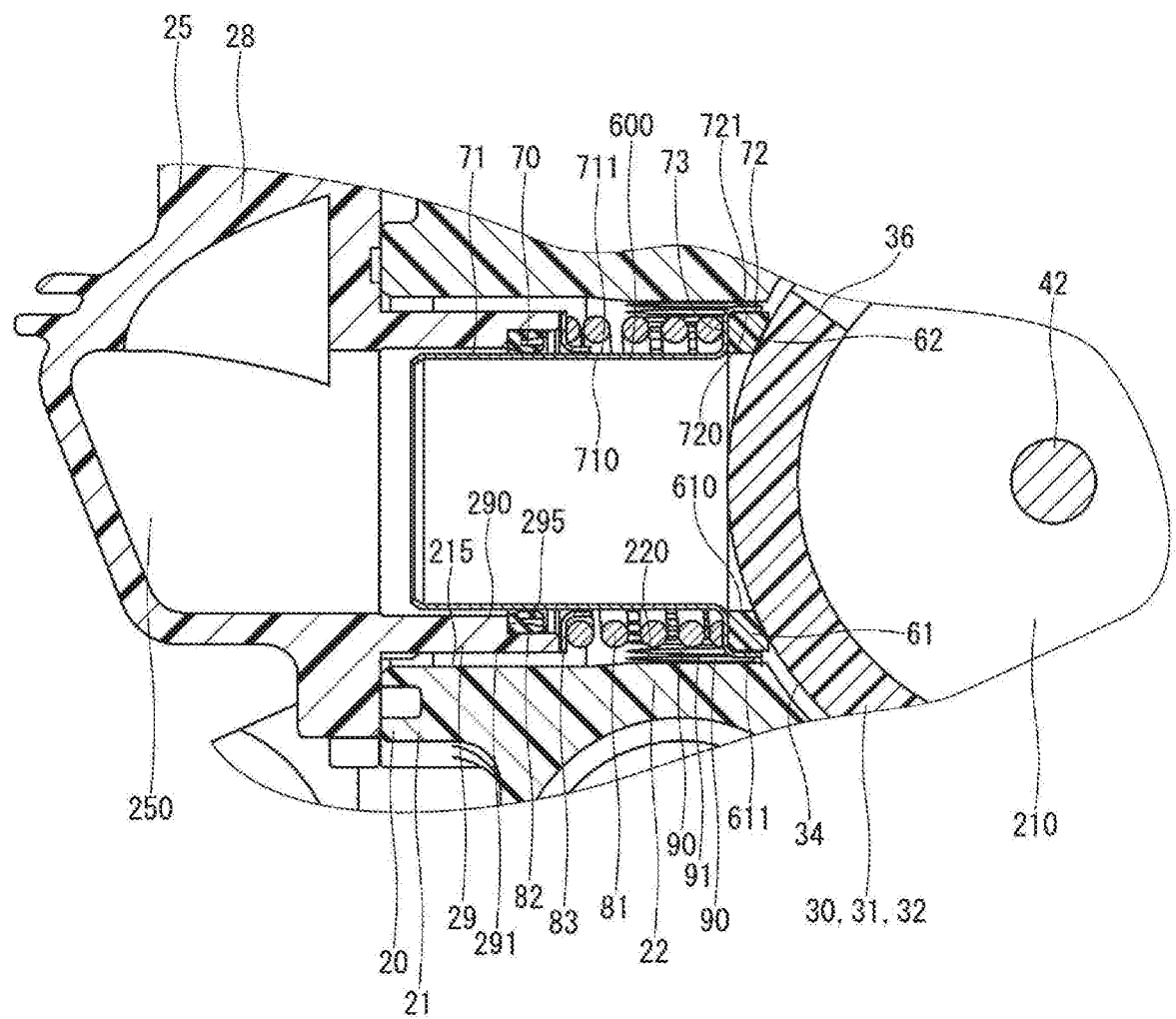
FIG. 10 is a schematic cross-sectional view showing the valve seat unit and its related parts and components of the cooling water control valve device of a second embodiment.
Figure 11:
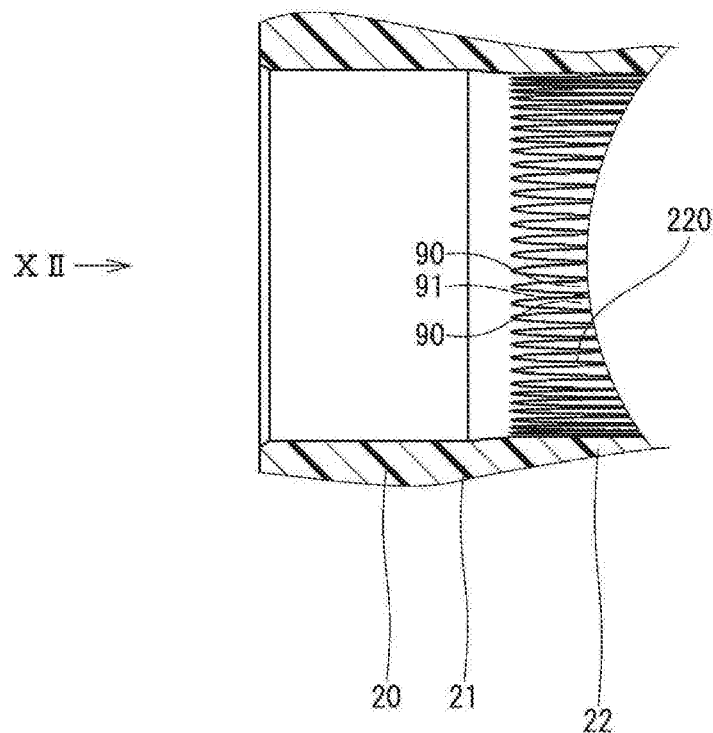
FIG. 11 is a schematic cross-sectional view showing the cylindrical passage member of the housing according to the cooling water control valve device of the second embodiment.
Figure 12:
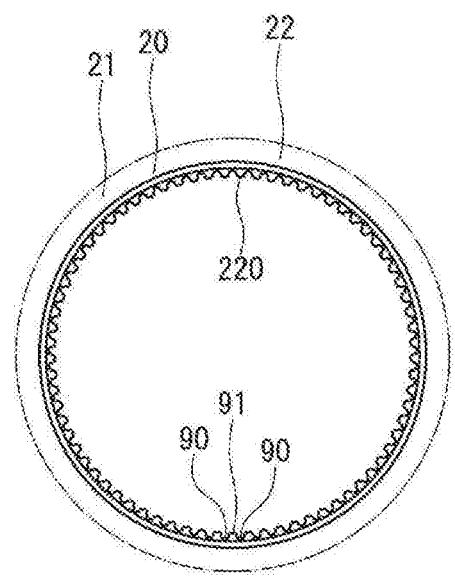
FIG. 12 is a schematic view of the cylindrical passage member when viewed it in a direction of XII in FIG. 11.

A part of the cooling water control valve device according to a second embodiment is shown in FIGS. 10 to 12. The second embodiment is different from the first embodiment in a position, in which the grooves 90 are formed, and so on.

In the second embodiment, the outer diameter of the second cylindrical portion 72 of the sleeve 70 is slightly smaller than the inner diameter of the axial end of the housing cylindrical portion 22, which is on the side closer to the valve unit 30. Therefore, the outer peripheral surface 721 of the second cylindrical portion 72 is positioned by the inner peripheral surface 220 of the housing cylindrical portion 22 in the radial direction and the second cylindrical portion 72 is movable in the axial direction in the reciprocal manner. In the present embodiment, the second cylindrical portion 72 corresponds to the positioned member. A predetermined clearance is formed between the outer peripheral surface 721 of the second cylindrical portion 72 and the inner peripheral surface 220 of the housing cylindrical portion 22, wherein variation of the component tolerance is taken into consideration to suppress the variation of the opening start position of the valve unit 30. The housing cylindrical portion 22 corresponds to the cylindrical passage member. The housing unit 20 includes the housing cylindrical portion 22 working as the cylindrical passage member, through which the cooling water passes.

The outer diameter of the first cylindrical portion 71 of the sleeve 70 is slightly smaller than the inner diameter of the pipe cylindrical portion 29. As a result, a space of an annular shape is formed between the outer peripheral surface 711 of the first cylindrical portion 71 and the inner peripheral surface 290 of the pipe cylindrical portion 29. The first cylindrical portion 71 is movable in the axial direction in the reciprocal manner without the sliding movement between the outer peripheral surface 711 and the inner peripheral surface 290 of the pipe cylindrical portion 29. The outer peripheral surface 711 of the first cylindrical portion 71 may be occasionally in contact with the inner peripheral surface 290 of the pipe cylindrical portion 29.

When the valve unit 30 is rotated around its axis by the rotational movement of the electric motor 40, the valve seat surface 62 slides on the ball-shaped surface 34 and rotates relative to the ball-shaped surface 34 in the circumferential direction of the valve main body 31. During this operation, the valve seat surface 62 of the valve seat unit 600 is aligned to the ball-shaped surface 34, in a condition that the outer peripheral surface 721 of the second cylindrical portion 72 is in contact with the inner peripheral surface 220 of the housing cylindrical portion 22.

In the present embodiment, the grooves 90 are formed in the housing cylindrical portion 22. As shown in FIGS. 10 to 12, the grooves 90 are formed in the inner peripheral surface 220 of the housing cylindrical portion 22 on the axial side closer to the valve unit 30, wherein each of the grooves 90 is recessed in the radial-outward direction from the inner peripheral surface 220. In addition, the grooves 90 are formed in the inner peripheral surface 220 in such a way that each of the grooves 90 straightly extends from the axial end of the inner peripheral surface 220 on the side closer to the valve unit 30 to an axial center position of the first cylindrical portion 71 of the sleeve 70 (FIGS. 10 and 11). In other words, the grooves 90 are formed at least in a part of the overlapping area, at which the housing cylindrical portion 22 and the second cylindrical portion 72 overlap each other in the axial direction (FIG. 10). The multiple grooves 90 are formed at equal intervals in the circumferential direction of the housing cylindrical portion 22 (FIG. 12).

As shown in FIG. 12, the neighboring two grooves 90 of the multiple grooves 90 are connected to each other in the circumferential direction of the housing cylindrical portion 22 to form the connecting portion 91. In the present embodiment, each of the multiple grooves 90 forms the connecting portion 91 with the neighboring groove 90. The profile of the connecting portion 91 on the cross-sectional plane perpendicular to the axis of the housing cylindrical portion 22 is formed in the curved shape, which is protruded in the radial-inward direction of the housing cylindrical portion 22 (FIG. 12). The inner peripheral surface 220 is formed on each center of the connecting portions 91, namely, on each boundary between the neighboring grooves 90. As above, in the present embodiment, the wall surface is formed in such a way that the wall surface is continuously connected from the bottom of the groove 90 to the bottom of the neighboring groove 90 via the connecting portion 91 and the inner peripheral surface 220.

In the present embodiment, even when the extraneous material, such as the casting sand, enters the clearance between the outer peripheral surface 721 of the second cylindrical portion 72 of the sleeve 70 and the inner peripheral surface 220 of the housing cylindrical portion 22, it is possible to let the extraneous material to escape into the grooves 90. It is thereby possible to suppress the alignment failure of the valve seat surface 62, which may be caused by the extraneous material entering the clearance between the sleeve 70 and the housing cylindrical portion 22. The extraneous material, which escaped to the grooves 90, is discharged to the side of the valve unit 30 from the end of the grooves 90 on the side closer to the valve unit 30 (FIG. 10).

As explained above, in the present embodiment, the housing unit 20 includes the housing cylindrical portion 22, through which the cooling water flows. The valve seat unit 600 includes the second cylindrical portion 72 as the positioned member of the cylindrical shape, wherein the outer peripheral surface 721 is positioned by the inner peripheral surface 220 of the housing cylindrical portion 22 in the radial direction and the second cylindrical portion 72 is movable in the axial direction in the reciprocal manner. The valve seat unit 600 further includes the valve seat surface 62 of the annular shape to hold the fluid tight condition between the valve seat surface 62 and the valve main body 31, when the valve seat surface 62 is in contact with the ball-shaped surface 34 of the valve main body 31 on the axial side of the second cylindrical portion 72. The housing cylindrical portion 22 of the housing unit 20 includes the grooves 90, which are formed at least in the part of the overlapping area in the axial direction between the housing cylindrical portion 22 and the second cylindrical portion 72, wherein the grooves 90 are recessed in the radial-outward direction. In the present embodiment, it is possible to avoid the alignment failure of the valve seat surface 62 and to suppress the leakage of the cooling water in the valve fully closed condition achieved by the valve seat unit 600, in the same manner to the first embodiment.

Third Embodiment

Figure 13:
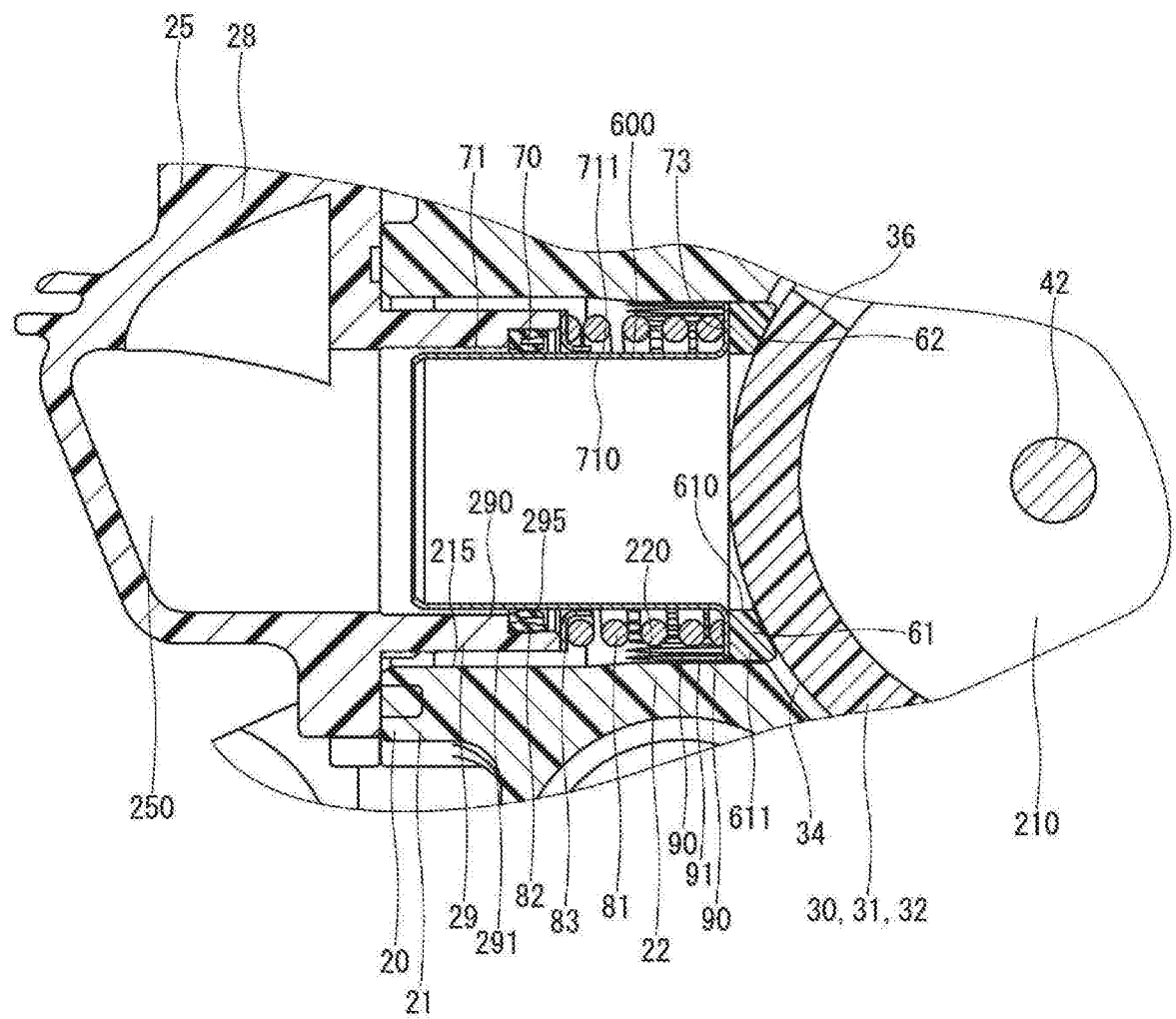
FIG. 13 is a schematic cross-sectional view showing the valve seat unit and its related parts and components of the cooling water control valve device of a third embodiment.

A part of the cooling water control valve device according to a third embodiment is shown in FIG. 13. The third embodiment is different from the second embodiment in a structure of the sleeve 70 and so on.

In the third embodiment, the sleeve 70 does not have a structure corresponding to the second cylindrical portion 72 of the second embodiment. An outer diameter of the valve seat member 61 is slightly smaller than the inner diameter of the axial end of the housing cylindrical portion 22 on the side closer to the valve unit 30. Therefore, the outer peripheral surface 611 of the valve seat member 61 is positioned by the inner peripheral surface 220 of the housing cylindrical portion 22 in the radial direction and the valve seat member 61 is movable in the axial direction in the reciprocal manner. In the present embodiment, the valve seat member 61 corresponds to the positioned member. A predetermined clearance is formed between the outer peripheral surface 611 of the valve seat member 61 and the inner peripheral surface 220 of the housing cylindrical portion 22, wherein variation of the component tolerance is taken into consideration to suppress the variation of the opening start position of the valve unit 30.

When the valve unit 30 is rotated around its axis by the rotational movement of the electric motor 40, the valve seat surface 62 slides on the ball-shaped surface 34 and rotates relative to the ball-shaped surface 34 in the circumferential direction of the valve main body 31. During this operation, the valve seat surface 62 of the valve seat unit 600 is aligned to the ball-shaped surface 34, in a condition that the outer peripheral surface 611 of the valve seat member 61 is in contact with the inner peripheral surface 220 of the housing cylindrical portion 22.

In the present embodiment, the grooves 90 are formed at least in a part of the inner peripheral surface 220 of the housing cylindrical portion 22, at which the housing cylindrical portion 22 and the valve seat member 61 overlap each other in the axial direction (FIG. 13).

In the present embodiment, even when the extraneous material, such as the casting sand, enters the clearance between the outer peripheral surface 611 of the valve seat member 61 and the inner peripheral surface 220 of the housing cylindrical portion 22, it is possible to let the extraneous material to escape into the grooves 90. It is thereby possible to suppress the alignment failure of the valve seat surface 62, which may be caused by the extraneous material entering the clearance between the valve seat member 61 and the housing cylindrical portion 22. The extraneous material, which escaped to the grooves 90, is discharged to the side of the valve unit 30 from the axial end of the grooves 90 on the side closer to the valve unit 30 (FIG. 13).

As explained above, in the present embodiment, the valve seat unit 600 includes the valve seat member 61 as the positioned member of the cylindrical shape, wherein the outer peripheral surface 611 is positioned by the inner peripheral surface 220 of the housing cylindrical portion 22 in the radial direction and the valve seat member 61 is movable in the axial direction in the reciprocal manner. The valve seat unit 600 further includes the valve seat surface 62 of the annular shape to hold the fluid tight condition between the valve seat surface 62 and the valve main body 31, when the valve seat surface 62 is in contact with the ball-shaped surface 34 of the valve main body 31 on the axial side of the valve seat member 61. The housing cylindrical portion 22 of the housing unit 20 includes the grooves 90, which are formed at least in the part of the overlapping area in the axial direction between the housing cylindrical portion 22 and the vale seat member 61, wherein the grooves 90 are recessed from the inner peripheral surface 220 in the radial-outward direction. In the present embodiment, it is possible to avoid the alignment failure of the valve seat surface 62 and to suppress the leakage of the cooling water in the valve fully closed condition achieved by the valve seat unit 600, in the same manner to the second embodiment.

Fourth Embodiment

Figure 14:
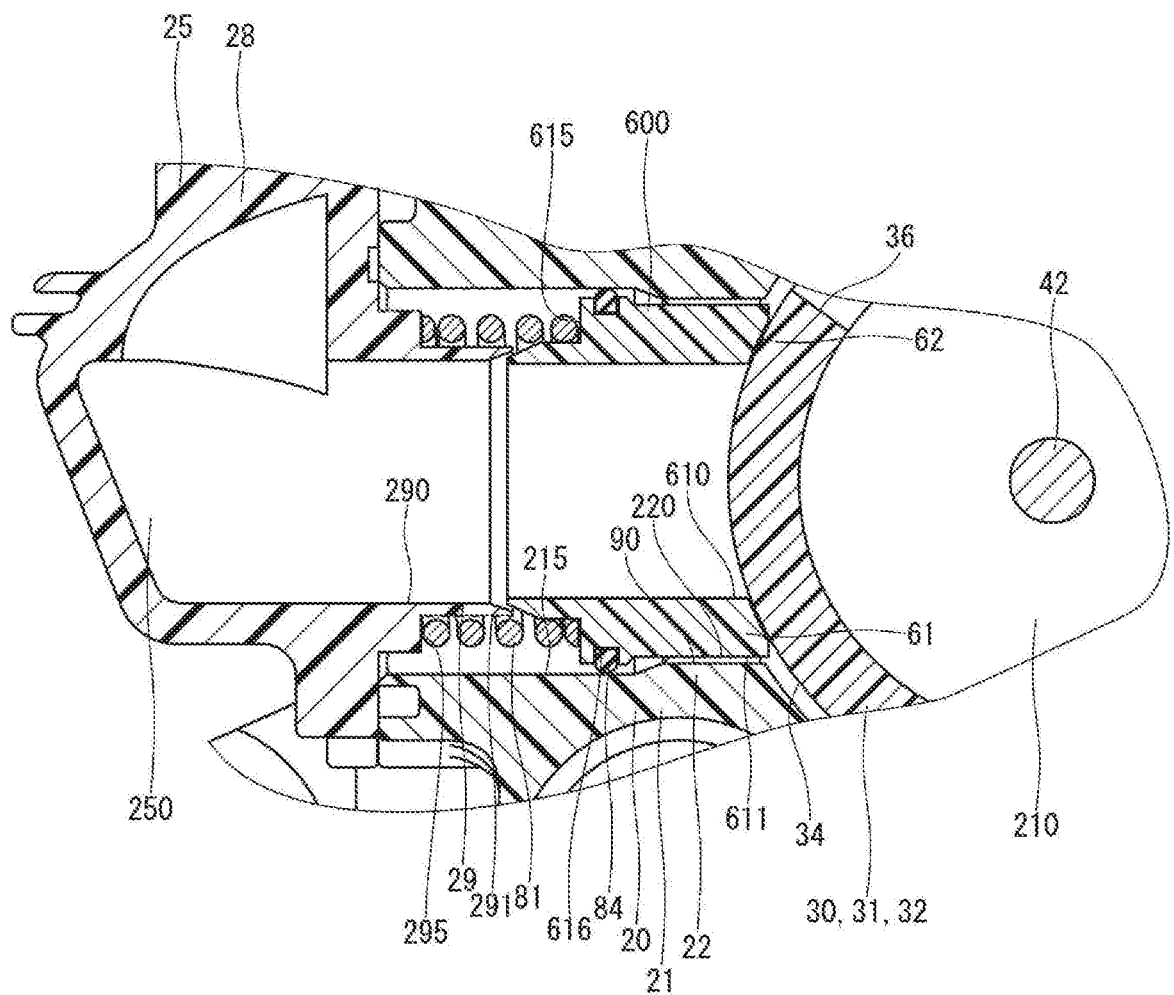
FIG. 14 is a schematic cross-sectional view showing the valve seat unit and its related parts and components of the cooling water control valve device of a fourth embodiment.
Figure 15:
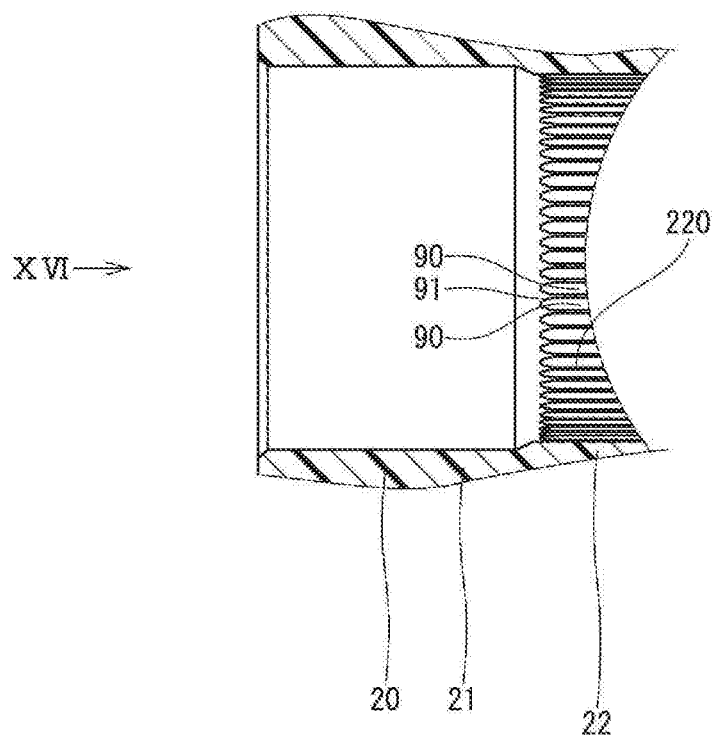
FIG. 15 is a schematic cross-sectional view showing the cylindrical passage member of the housing according to the cooling water control valve device of the fourth embodiment.
Figure 16:
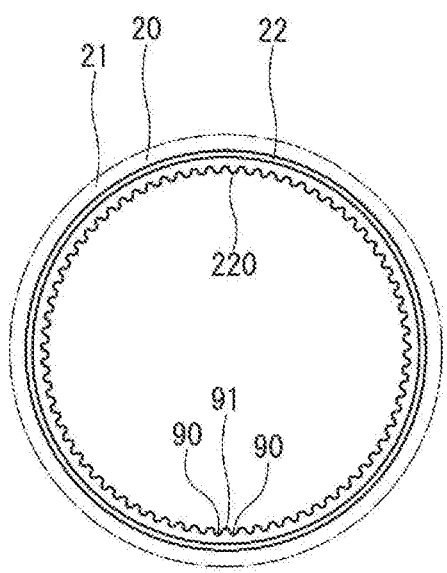
FIG. 16 is a schematic view of the cylindrical passage member when viewed it in a direction of XVI in FIG. 15.

A part of the cooling water control valve device according to a fourth embodiment is shown in FIGS. 14 to 16. The fourth embodiment is different from the third embodiment in a structure of the valve seat unit 600 and so on.

In the fourth embodiment, the valve seat unit 600 does not have a structure corresponding to the sleeve 70 of the third embodiment. The valve seat member 61 is made of, for example, elastomer resin having a predetermined stiffness and formed in a cylindrical shape. An outer diameter of an axial end of the valve seat member 61 on the side closer to the valve unit 30 is slightly smaller than the inner diameter of the axial end of the housing cylindrical portion 22 on the side closer to the valve unit 30. Therefore, the outer peripheral surface 611 is positioned by the inner peripheral surface 220 of the housing cylindrical portion 22 in the radial direction and the valve seat member 61 is movable in the axial direction in the reciprocal manner. In the present embodiment, the valve seat member 61 corresponds to the positioned member. A predetermined clearance is formed between the outer peripheral surface 611 of the valve seat member 61 and the inner peripheral surface 220 of the housing cylindrical portion 22, wherein variation of the component tolerance is taken into consideration to suppress the variation of the opening start position of the valve unit 30.

The valve seat surface 62 is formed at an axial end surface of the valve seat member 61 on the side closer to the valve unit 30. The valve seat surface 62 may be coated with, for example, fluorine resin. An annular groove 616 is formed in the valve seat member 61 on the side closer to the pipe unit 25 in such a way that the annular groove 616 is recessed from the outer peripheral surface 611 in a radial-inward direction in an annular shape. A seal element 84 of an annular shape, which is made of rubber, is provided in the annular groove 616. The seal element 84 is capable of sliding with respect to the inner peripheral surface 220 of the housing cylindrical portion 22 in a condition that an outer peripheral surface of the seal element 84 is fluid tightly in contact with the inner peripheral surface 220. It is thereby possible to hold the fluid tight condition between the seal element 84 and the housing cylindrical portion 22.

A step surface 615 is formed in the valve seat member 61 on the side closer to the pipe unit 25 in such a way that the step surface 615 is recessed from the outer peripheral surface 611 in the radial-inward direction in the annular shape. A step surface 295 is formed in the pipe cylindrical portion 29 in such a way that it extends from the outer peripheral surface 291 in a radial-outward direction in an annular shape. One end of the spring 81 is in contact with the step surface 615 of the valve seat member 61, while the other end of the spring 81 is in contact with the step surface 295 of the pipe cylindrical portion 29. According to the above structure, the spring 81 biases the valve seat member 61 in the direction to the valve unit 30. The valve seat surface 62 is thereby pushed to the ball-shaped surface 34 of the valve unit 30.

As shown in FIG. 14, an axial end of the valve seat member 61 on the side closer to the pipe unit 25 is formed in a tapered shape so that the outer peripheral surface comes closer to the axis in the direction from the valve unit 30 to the pipe unit 25. In addition, an axial end of the pipe cylindrical portion 29 on the side closer to the valve unit 30 is formed in a tapered shape so that the inner peripheral surface comes closer to the axis in the direction from the valve unit 30 to the pipe unit 25. The axial end of the valve seat member 61 on the side closer to the pipe unit 25 is located at a position inside of the axial end of the pipe cylindrical portion 29 on the side closer to the valve unit 30, in a condition that the valve seat surface 62 is in contact with the ball-shaped surface 34 of the valve main body 31. An annular space is formed between the outer peripheral surface of the axial end of the valve seat member 61 on the side closer to the pipe unit 25 and the inner peripheral surface of the axial end of the pipe cylindrical portion 29 on the side closer to the valve unit 30. Accordingly, the valve seat member 61 is movable in the axial direction between the valve unit 30 and the pipe unit 25 in the reciprocal manner.

When the valve unit 30 is rotated around its axis by the rotational movement of the electric motor 40, the valve seat surface 62 slides on the ball-shaped surface 34 and rotates relative to the ball-shaped surface 34 in the circumferential direction of the valve main body 31. During this operation, the valve seat surface 62 of the valve seat unit 600 is aligned to the ball-shaped surface 34, in a condition that the outer peripheral surface 611 of the valve seat member 61 is in contact with the inner peripheral surface 220 of the housing cylindrical portion 22.

In the present embodiment, the grooves 90 are formed in the inner peripheral surface 220 of the housing cylindrical portion 22 in such a way that each of the grooves 90 straightly extends from the axial end of the inner peripheral surface 220 on the side closer to the valve unit 30 to an axial center position of the valve seat member 61 (FIGS. 14 and 15). In other words, the grooves 90 are formed at least in a part of an overlapping area, at which the housing cylindrical portion 22 and the valve seat member 61 overlap each other in the axial direction (FIG. 14).

In the present embodiment, even when the extraneous material, such as the casting sand, enters the clearance between the outer peripheral surface 611 of the valve seat member 61 and the inner peripheral surface 220 of the housing cylindrical portion 22, it is possible to let the extraneous material to escape into the grooves 90. It is thereby possible to suppress the alignment failure of the valve seat surface 62, which may be caused by the extraneous material entering the clearance between the valve seat member 61 and the housing cylindrical portion 22. The extraneous material, which escaped to the grooves 90, is discharged to the side of the valve unit 30 from the axial end of the grooves 90 on the side closer to the valve unit 30 (FIG. 14).

As explained above, in the present embodiment, the valve seat unit 600 includes the valve seat member 61 as the positioned member of the cylindrical shape, wherein the outer peripheral surface 611 is positioned by the inner peripheral surface 220 of the housing cylindrical portion 22 in the radial direction and the valve seat member 61 is movable in the axial direction in the reciprocal manner. The housing cylindrical portion 22 of the housing unit 20 includes the grooves 90, which are formed at least in the part of the overlapping area in the axial direction between the housing cylindrical portion 22 and the vale seat member 61, wherein the grooves 90 are recessed from the inner peripheral surface 220 in the radial-outward direction. In the present embodiment, it is possible to avoid the alignment failure of the valve seat surface 62 and to suppress the leakage of the cooling water in the valve fully closed condition achieved by the valve seat unit 600, in the same manner to the third embodiment.

Fifth Embodiment

Figure 17:
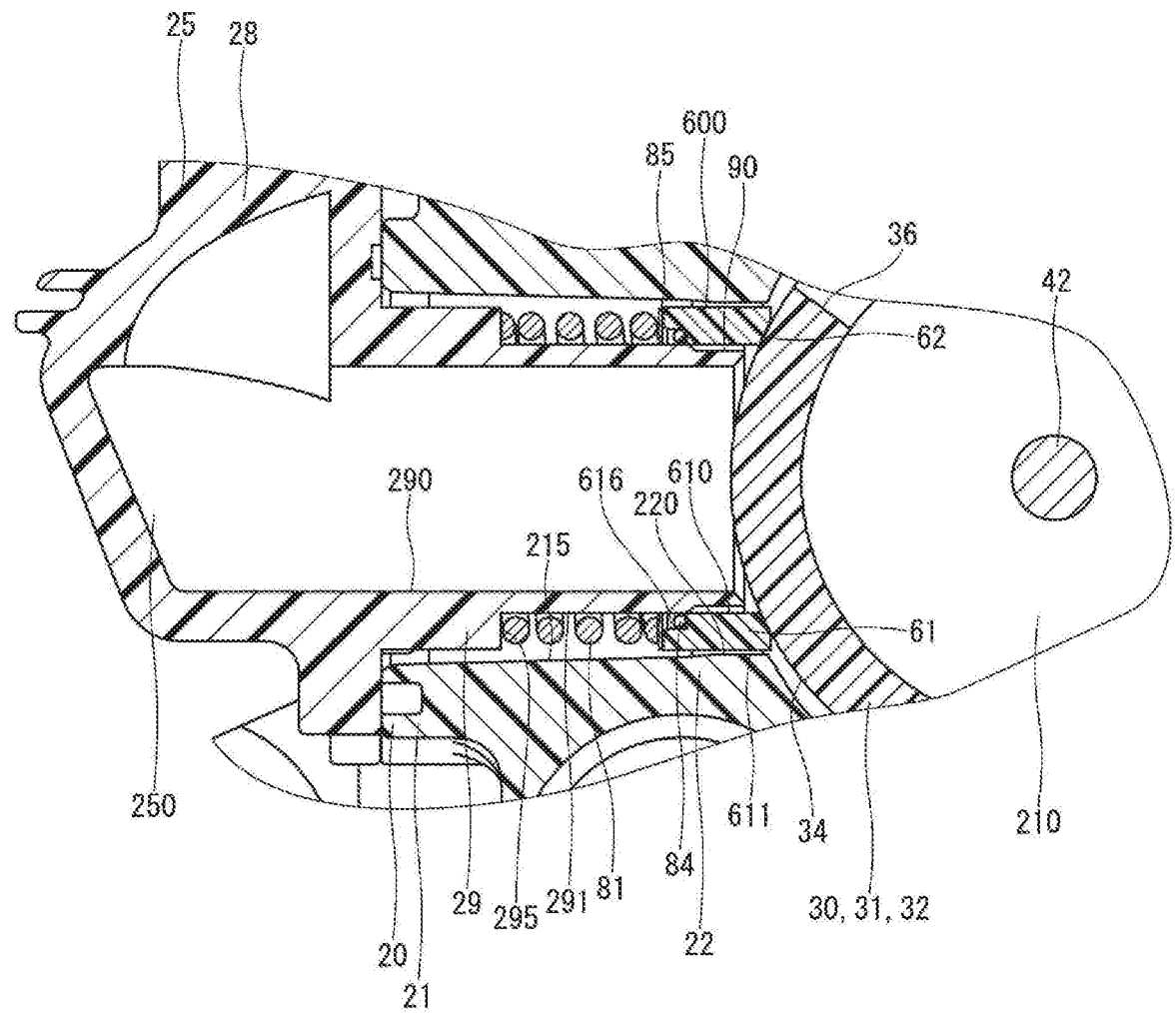
FIG. 17 is a schematic cross-sectional view showing the valve seat unit and its related parts and components of the cooling water control valve device of a fifth embodiment.
Figure 18:
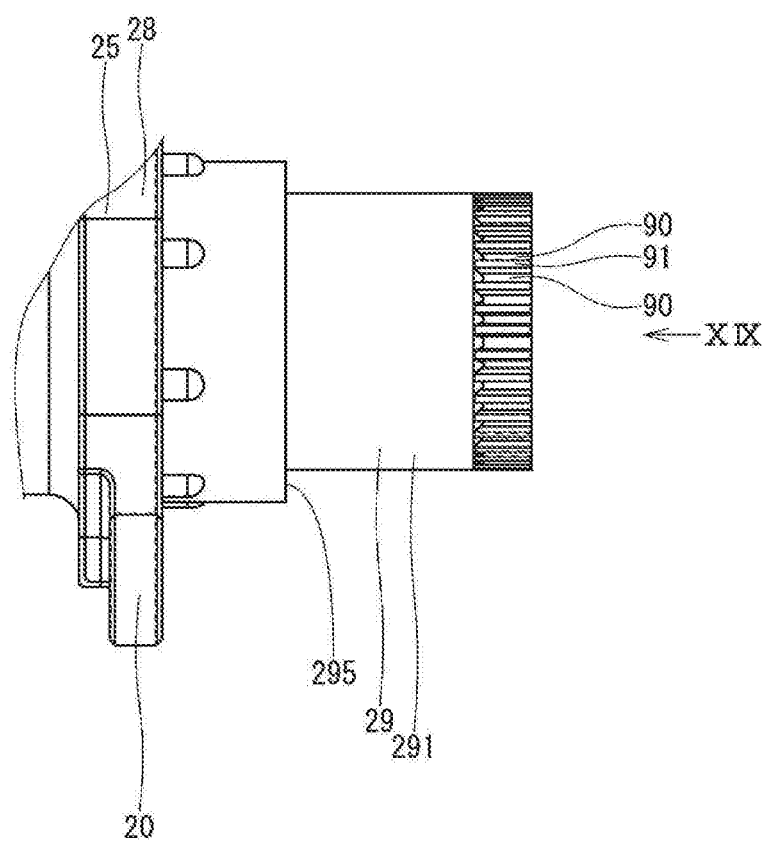
FIG. 18 is a schematic cross-sectional view showing the cylindrical passage member of the housing according to the cooling water control valve device of the fifth embodiment.
Figure 19:
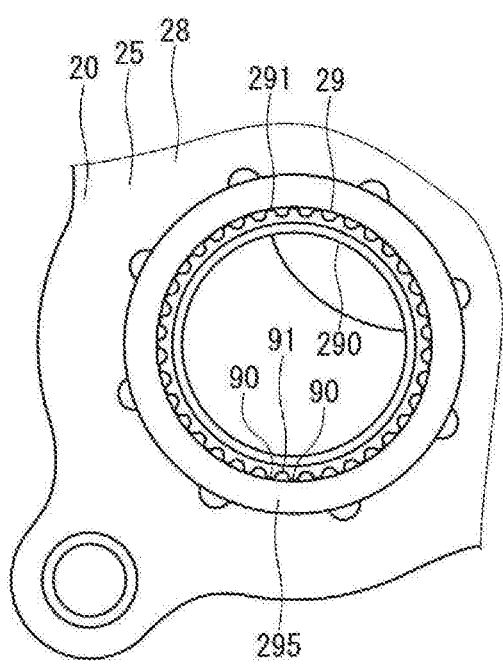
FIG. 19 is a schematic view of the cylindrical passage member when viewed it in a direction of XIX in FIG. 18.

A part of the cooling water control valve device according to a fifth embodiment is shown in FIGS. 17 to 19. The fifth embodiment is different from the fourth embodiment in a position of the valve seat member 61 of the valve seat unit 600 and so on.

In the fifth embodiment, the pipe cylindrical portion 29 is formed in such a way that an axial end of the pipe cylindrical portion 29 on the side closer to the valve unit 30 is located at a position adjacent to the valve unit 30. The valve seat member 61 of the annular shape is located at a radial-outside position of the axial end of the pipe cylindrical portion 29 on the side closer to the valve unit 30. An inner diameter of the valve seat member 61 is slightly larger than an outer diameter of the pipe cylindrical portion 29 on the side closer to the valve unit 30. Therefore, an inner peripheral surface 610 of the valve seat member 61 is positioned by the outer peripheral surface 291 of the pipe cylindrical portion 29 in the radial direction and the valve seat member 61 is movable in the axial direction in the reciprocal manner. In the present embodiment, the valve seat member 61 corresponds to the positioned member. A predetermined clearance is formed between the inner peripheral surface 610 of the valve seat member 61 and the outer peripheral surface 291 of the pipe cylindrical portion 29, wherein variation of the component tolerance is taken into consideration to suppress the variation of the opening start position of the valve unit 30. In addition, the pipe cylindrical portion 29 corresponds to the cylindrical passage member. The housing unit 20 includes the pipe cylindrical portion 29 as the cylindrical passage member, through which the cooling water flows.

The annular groove 616 is formed in the valve seat member 61 on the side closer to the pipe unit 25 in such a way that the annular groove 616 is recessed from the inner peripheral surface 610 in a radial-outward direction in the annular shape. The seal element 84 of the annular shape, which is made of rubber, is provided in the annular groove 616. The seal element 84 is capable of sliding with respect to the outer peripheral surface 291 of the pipe cylindrical portion 29 in the condition that an inner peripheral surface of the seal element 84 is fluid tightly in contact with the outer peripheral surface 291. It is thereby possible to hold the fluid tight condition between the seal element 84 and the pipe cylindrical portion 29. In the present embodiment, a spring seat 85 made of metal is provided at the axial end of the valve seat member 61 on the side opposite to the side closer to the valve unit 30. The spring seat 85 is formed in an annular plate shape. One end of the spring 81 is in contact with the spring seat 85, while the other end of the spring 81 is in contact with the step surface 295 of the pipe cylindrical portion 29. According to the above structure, the spring 81 biases the valve seat member 61 to the valve unit 30 via the spring seat 85.

When the valve unit 30 is rotated around its axis by the rotational movement of the electric motor 40, the valve seat surface 62 slides on the ball-shaped surface 34 and rotates relative to the ball-shaped surface 34 in the circumferential direction of the valve main body 31. During this operation, the valve seat surface 62 of the valve seat unit 600 is aligned to the ball-shaped surface 34, in a condition that the inner peripheral surface 610 of the valve seat member 61 is in contact with the outer peripheral surface 291 of the pipe cylindrical portion 29.

In the present embodiment, the grooves 90 are formed in the pipe cylindrical portion 29. The grooves 90 are formed in the outer peripheral surface 291 of the pipe cylindrical portion 29 on the side closer to the valve unit 30 in such a way that each of the grooves 90 is recessed from the outer peripheral surface 291 in the radial-inward direction. The grooves 90 are formed in such a way that each of the grooves 90 straightly extends from the axial end of the outer peripheral surface 291 on the side closer to the valve unit 30 in the direction to the pipe unit 25 to such a position, which is separated from the axial end by a predetermined distance (FIGS. 17 and 18). In other words, the grooves 90 are formed at least in the part of the overlapping area, at which the pipe cylindrical portion 29 and the valve seat member 61 overlap each other in the axial direction (FIG. 17). The multiple grooves 90 are formed at equal intervals in the circumferential direction of the pipe cylindrical portion 29 (FIG. 19).

As shown in FIG. 19, the neighboring two grooves 90 of the multiple grooves 90 are connected to each other in the circumferential direction of the pipe cylindrical portion 29 to form the connecting portion 91. In the present embodiment, each of the multiple grooves 90 forms the connecting portion 91 with the neighboring groove 90. The profile of the connecting portion 91 on the cross-sectional plane perpendicular to the axis of the pipe cylindrical portion 29 is formed in the curved shape, which is protruded in the radial-outward direction of the pipe cylindrical portion 29 (FIG. 19). The outer peripheral surface 291 is formed on each center of the connecting portions 91, namely, on each boundary between the neighboring grooves 90. As above, in the present embodiment, the wall surface is formed in such a way that the wall surface is continuously connected from the bottom of the groove 90 to the bottom of the neighboring groove 90 via the connecting portion 91 and the outer peripheral surface 291.

In the present embodiment, even when the extraneous material, such as the casting sand, enters the clearance between the inner peripheral surface 610 of the valve seat member 61 and the outer peripheral surface 291 of the pipe cylindrical portion 29, it is possible to let the extraneous material to escape into the grooves 90. It is thereby possible to suppress the alignment failure of the valve seat surface 62, which may be caused by the extraneous material entering the clearance between the valve seat member 61 and the pipe cylindrical portion 29. The extraneous material, which escaped to the grooves 90, is discharged to the side of the valve unit 30 from the end of the grooves 90 on the side closer to the valve unit 30 (FIG. 17).

As explained above, in the present embodiment, the valve seat unit 600 includes the valve seat member 61 as the positioned member of the cylindrical shape, wherein the inner peripheral surface 610 is positioned by the outer peripheral surface 291 of the pipe cylindrical portion 29 (as the cylindrical passage member) in the radial direction and the valve seat unit 600 is movable in the axial direction in the reciprocal manner. The pipe cylindrical portion 29 of the housing unit 20 includes the grooves 90, which are formed at least in the part of the overlapping area in the axial direction between the pipe cylindrical portion 29 and the valve seat member 61, wherein the grooves 90 are recessed in the radial-inward direction from the outer peripheral surface 291. In a similar manner to the fourth embodiment, in the fifth embodiment, since the radial positioning accuracy and the alignment accuracy of the valve seat surface 62 to the valve main body 31 are high, it is possible to stabilize the opening start position of the valve unit 30. In addition, in the present embodiment, it is possible to avoid the alignment failure of the valve seat surface 62 and to suppress the leakage of the cooling water in the valve fully closed condition achieved by the valve seat unit 600, in the same manner to the fourth embodiment.

Sixth Embodiment

Figure 20:
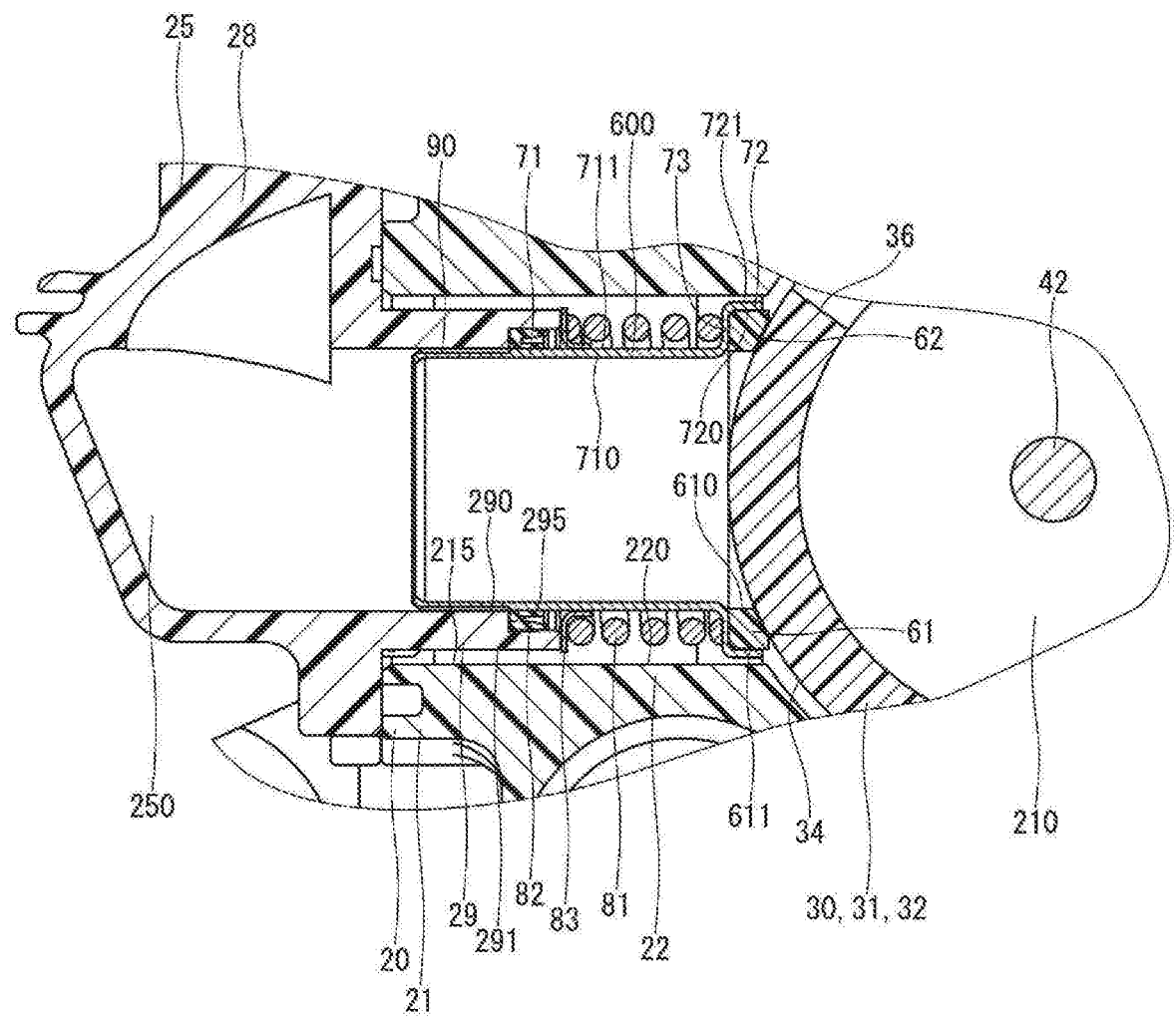
FIG. 20 is a schematic cross-sectional view showing the valve seat unit and its related parts and components of the cooling water control valve device of a sixth embodiment.

A part of the cooling water control valve device according to a sixth embodiment is shown in FIG. 20. The sixth embodiment is different from the first embodiment in a position of the grooves 90 and so on.

In the sixth embodiment, the sleeve 70 is formed in such a way that it is made of material having a larger thickness than that of the sleeve 70 of the first embodiment. The grooves 90 are formed in the first cylindrical portion 71 of the sleeve 70 (working as the positioned member). As shown in FIG. 20, the grooves 90 are formed in the outer peripheral surface 711 of the first cylindrical portion 71 on a side opposite to the valve unit 30 in such a way that each of the grooves 90 is recessed from the outer peripheral surface 711 in the radial-inward direction. The grooves 90 are further formed in such a way that each of the grooves 90 straightly extends in the outer peripheral surface 711 from an axial end thereof on the side opposite to the valve unit 30 to a position of the step surface 295 of the pipe cylindrical portion 29 (FIG. 20). In other words, the grooves 90 are formed at least in the part of the overlapping area at which the pipe cylindrical portion 29 (working as the cylindrical passage member) and the first cylindrical portion 71 overlap each other in the axial direction (FIG. 20). The multiple grooves 90 are formed at equal intervals in the circumferential direction of the first cylindrical portion 71.

The neighboring two grooves 90 of the multiple grooves 90 are connected to each other in the circumferential direction of the first cylindrical portion 71 to form the connecting portion. In the present embodiment, each of the multiple grooves 90 forms the connecting portion with the neighboring groove 90. The profile of the connecting portion on the cross-sectional plane perpendicular to the axis of the first cylindrical portion 71 is formed in the curved shape, which is protruded in the radial-outward direction of the first cylindrical portion 71. The outer peripheral surface 711 is formed on each center of the connecting portions, namely, on each boundary between the neighboring grooves 90. As above, in the present embodiment, the wall surface is formed in such a way that the wall surface is smoothly and continuously connected from the bottom of the groove 90 to the bottom of the neighboring groove 90 via the connecting portion and the outer peripheral surface 711.

In the present embodiment, even when the extraneous material, such as the casting sand, enters the clearance between the outer peripheral surface 711 of the first cylindrical portion 71 of the sleeve 70 and the inner peripheral surface 290 of the pipe cylindrical portion 29, it is possible to let the extraneous material to escape into the grooves 90. It is thereby possible to suppress the alignment failure of the valve seat surface 62, which may be caused by the extraneous material entering the clearance between the sleeve 70 and the pipe cylindrical portion 29. The extraneous material, which escaped to the grooves 90, is discharged to the side of the pipe main body 28 from the axial end of the grooves 90 on the side opposite to the valve unit 30 (FIG. 20).

As explained above, in the present embodiment, the valve seat unit 600 includes the first cylindrical portion 71 as the positioned member of the cylindrical shape, wherein the outer peripheral surface 711 is positioned by the inner peripheral surface 290 of the pipe cylindrical portion 29 in the radial direction and the first cylindrical portion 71 is movable in the axial direction in the reciprocal manner. The first cylindrical portion 71 of the valve seat unit 600 includes the grooves 90, which are formed at least in the part of the overlapping area in the axial direction between the first cylindrical portion 71 and the pipe cylindrical portion 29, wherein the grooves 90 are recessed in the radial-inward direction. In the present embodiment, in the same manner to the first embodiment, the radial positioning accuracy and the alignment accuracy of the valve seat surface 62 to the valve main body 31 are high and thereby it is possible to stabilize the opening start position of the valve unit 30. In addition, since the first cylindrical portion 71 of the valve seat unit 600 includes the grooves 90, it is possible to avoid the alignment failure of the valve seat surface 62 and to suppress the leakage of the cooling water in the valve fully closed condition achieved by the valve seat unit 600, in the same manner to the first embodiment.

Seventh Embodiment

Figure 21:
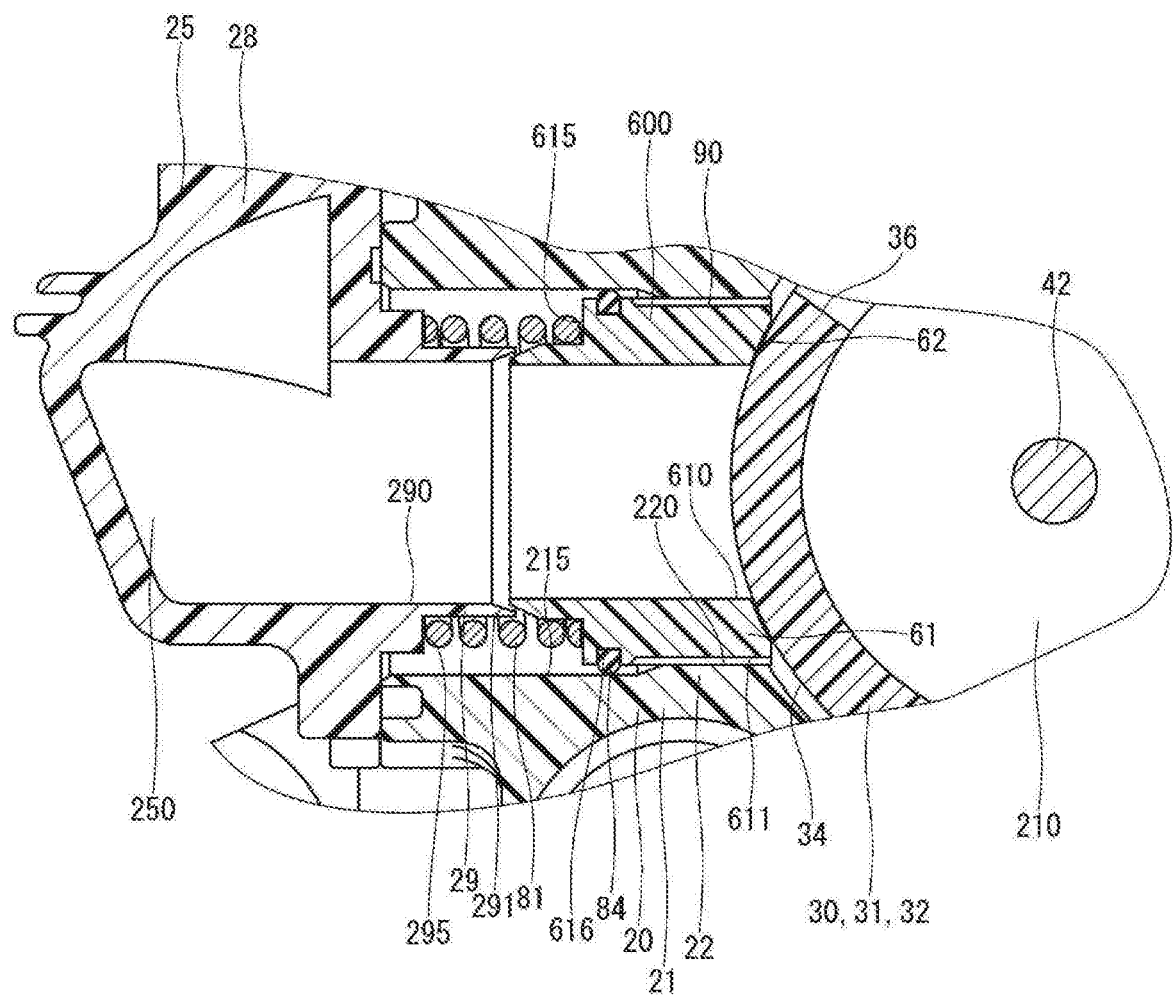
FIG. 21 is a schematic cross-sectional view showing the valve seat unit and its related parts and components of the cooling water control valve device of a seventh embodiment.

A part of the cooling water control valve device according to a seventh embodiment is shown in FIG. 21. The seventh embodiment is different from the fourth embodiment in a position of the grooves 90 and so on.

In the seventh embodiment, the grooves 90 are formed in the valve seat member 61 working as the positioned member. As shown in FIG. 21, the grooves 90 are formed in the outer peripheral surface 611 of the valve seat member 61 on the side closer to the valve unit 30 in such a way that each of the grooves 90 is recessed from the outer peripheral surface 611 in the radial-inward direction. The grooves 90 are formed in such a way that each of the grooves 90 straightly extends from the axial end of the outer peripheral surface 611 on the side closer to the valve unit 30 to a position adjacent to the annular groove 616 (FIG. 21). In other words, the grooves 90 are formed at least in the part of the overlapping area at which the housing cylindrical portion 22 (working as the cylindrical passage member) and the valve seat member 61 overlap each other in the axial direction (FIG. 21). The multiple grooves 90 are formed at equal intervals in the circumferential direction of the valve seat member 61.

The neighboring two grooves 90 of the multiple grooves 90 are connected to each other in the circumferential direction of the valve seat member 61 to form the connecting portion. In the present embodiment, each of the multiple grooves 90 forms the connecting portion with the neighboring groove 90. The profile of the connecting portion on the cross-sectional plane perpendicular to the axis of the valve seat member 61 is formed in the curved shape, which is protruded in the radial-outward direction of the valve seat member 61. The outer peripheral surface 611 is formed on each center of the connecting portions, namely, on each boundary between the neighboring grooves 90. As above, in the present embodiment, the wall surface is formed in such a way that the wall surface is smoothly and continuously connected from the bottom of the groove 90 to the bottom of the neighboring groove 90 via the connecting portion and the outer peripheral surface 611.

In the present embodiment, even when the extraneous material, such as the casting sand, enters the clearance between the outer peripheral surface 611 of the valve seat member 61 and the inner peripheral surface 220 of the housing cylindrical portion 22, it is possible to let the extraneous material to escape into the grooves 90. It is thereby possible to suppress the alignment failure of the valve seat surface 62, which may be caused by the extraneous material entering the clearance between the valve seat member 61 and the housing cylindrical portion 22. The extraneous material, which escaped to the grooves 90, is discharged to the side of the valve unit 30 from the axial end of the grooves 90 on the side closer to the valve unit 30 (FIG. 21).

As explained above, in the present embodiment, the valve seat unit 600 includes the valve seat member 61 working as the positioned member of the cylindrical shape, wherein the outer peripheral surface 611 is positioned by the inner peripheral surface 220 of the housing cylindrical portion 22 in the radial direction and the valve seat member 61 is movable in the axial direction in the reciprocal manner. The valve seat member 61 of the valve seat unit 600 includes the grooves 90, which are formed at least in the part of the overlapping area in the axial direction, wherein the grooves 90 are recessed in the radial-inward direction from the outer peripheral surface 611. In the present embodiment, in the same manner to the fourth embodiment, the radial positioning accuracy and the alignment accuracy of the valve seat surface 62 to the valve main body 31 are high and thereby it is possible to stabilize the opening start position of the valve unit 30. In addition, since the valve seat member 61 of the valve seat unit 600 includes the grooves 90, it is possible to avoid the alignment failure of the valve seat surface 62 and to suppress the leakage of the cooling water in the valve fully closed condition achieved by the valve seat unit 600, in the same manner to the first embodiment.

Eighth Embodiment

Figure 22:
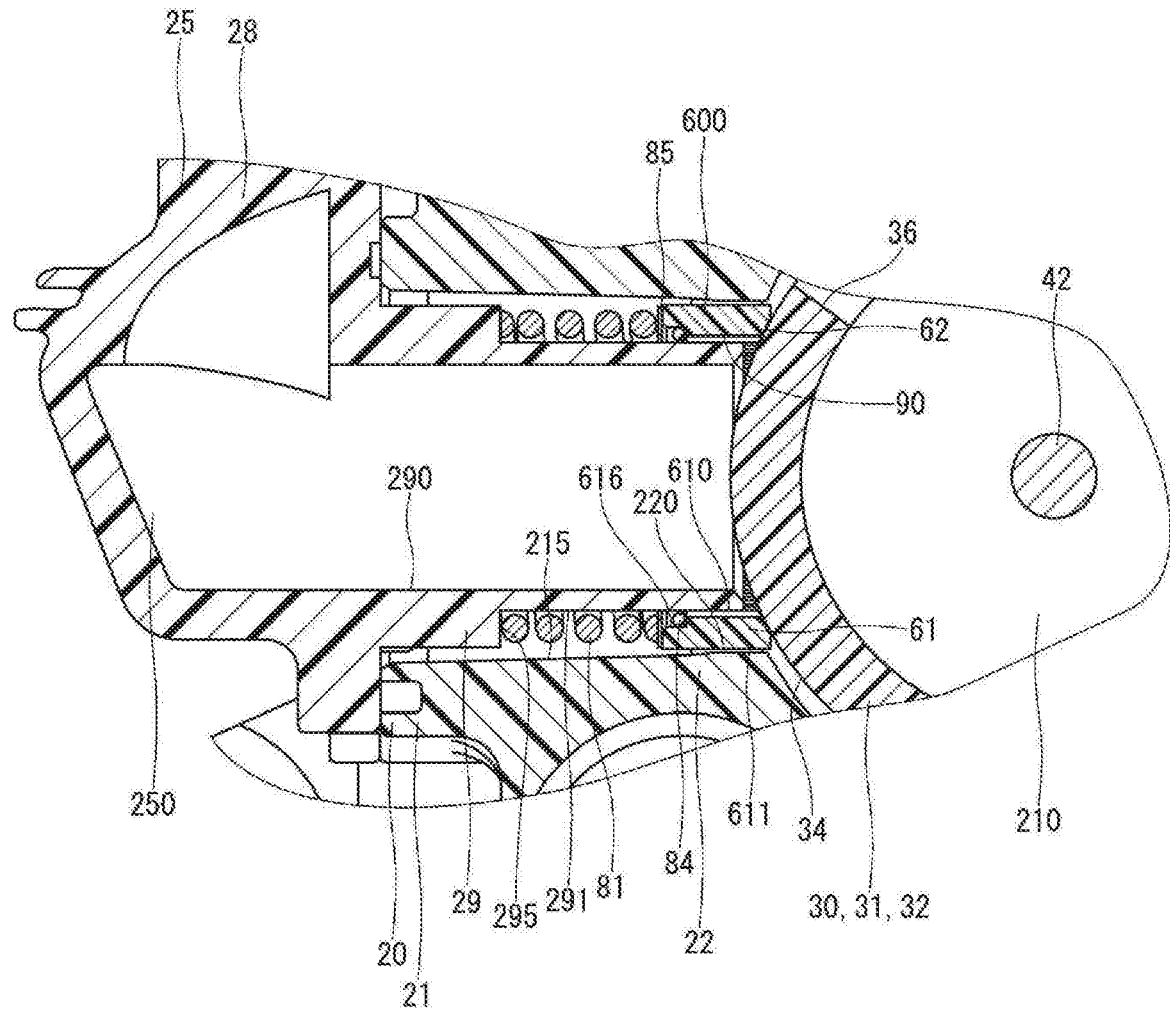
FIG. 22 is a schematic cross-sectional view showing the valve seat unit and its related parts and components of the cooling water control valve device of an eighth embodiment.

A part of the cooling water control valve device according to an eighth embodiment is shown in FIG. 22. The eighth embodiment is different from the fifth embodiment in a position of the grooves 90 and so on.

In the eighth embodiment, the grooves 90 are formed in the valve seat member 61 working as the positioned member. As shown in FIG. 22, the grooves 90 are formed in such a way that each of the grooves 90 is recessed from the inner peripheral surface 610 in the radial-outward direction. The grooves 90 are formed in such a way that each of the grooves 90 straightly extends from the axial end of the inner peripheral surface 610 on the side closer to the valve unit 30 to a position of the annular groove 616 (FIG. 22). In other words, the grooves 90 are formed at least in the part of the overlapping area at which the pipe cylindrical portion 29 (working as the cylindrical passage member) and the valve seat member 61 overlap each other in the axial direction (FIG. 22).

The neighboring two grooves 90 of the multiple grooves 90 are connected to each other in the circumferential direction of the valve seat member 61 to form the connecting portion. In the present embodiment, each of the multiple grooves 90 forms the connecting portion with the neighboring groove 90. The profile of the connecting portion on the cross-sectional plane perpendicular to the axis of the valve seat member 61 is formed in the curved shape, which is protruded in the radial-inward direction of the valve seat member 61. The inner peripheral surface 610 is formed on each center of the connecting portions, namely, on each boundary between the neighboring grooves 90. As above, in the present embodiment, the wall surface is formed in such a way that the wall surface is smoothly and continuously connected from the bottom of the groove 90 to the bottom of the neighboring groove 90 via the connecting portion and the inner peripheral surface 610.

In the present embodiment, even when the extraneous material, such as the casting sand, enters the clearance between the inner peripheral surface 610 of the valve seat member 61 and the outer peripheral surface 291 of the pipe cylindrical portion 29, it is possible to let the extraneous material to escape into the grooves 90. It is thereby possible to suppress the alignment failure of the valve seat surface 62, which may be caused by the extraneous material entering the clearance between the valve seat member 61 and the pipe cylindrical portion 29. The extraneous material, which escaped to the grooves 90, is discharged to the radial-inside of the valve seat member 61 from the axial end of the grooves 90 on the side closer to the valve unit 30 (FIG. 22).

As explained above, in the present embodiment, the valve seat unit 600 includes the valve seat member 61 working as the positioned member of the cylindrical shape, wherein the inner peripheral surface 610 is positioned by the outer peripheral surface 291 of the pipe cylindrical portion 29 (working as the cylindrical passage member) in the radial direction and the valve seat member 61 is movable in the axial direction in the reciprocal manner. The valve seat member 61 of the valve seat unit 600 includes the grooves 90, which are formed at least in the part of the overlapping area in the axial direction, wherein the grooves 90 are recessed in the radial-outward direction from the inner peripheral surface 610. In the present embodiment, in the same manner to the fifth embodiment, the radial positioning accuracy and the alignment accuracy of the valve seat surface 62 to the valve main body 31 are high and thereby it is possible to stabilize the opening start position of the valve unit 30. In addition, since the valve seat member 61 of the valve seat unit 600 includes the grooves 90, it is possible to avoid the alignment failure of the valve seat surface 62 and to suppress the leakage of the cooling water in the valve fully closed condition achieved by the valve seat unit 600, in the same manner to the fifth embodiment.

Further Embodiments

In a further embodiment of the present disclosure, the connecting portion may be formed by the neighboring two grooves, which are neighboring to each other in the circumferential direction of the cylindrical passage member or the positioned member, in such a way that the profile of the connecting portion on the cross-sectional plane perpendicular to the axis of the cylindrical passage member or the positioned member is formed in a straight line shape, which is protruded in the radial direction of the cylindrical passage member or the positioned member.

In addition, in a further embodiment of the present disclosure, the neighboring two grooves 90 of the multiple grooves 90, which are neighboring to each other in the circumferential direction of the cylindrical passage member or the positioned member, are not necessarily connected to each other. In other words, it is not always necessary for the grooves 90 to form the connecting portions.

In addition, in a further embodiment of the present disclosure, the grooves 90 may be formed in any size or at any position, so long as the grooves 90 are formed at least in the part of the overlapping area at which the cylindrical passage member and the positioned member overlap each other in the axial direction. In addition, in a still further embodiment of the present disclosure, the grooves 90 may not be necessarily formed in the straight line shape but can be formed in any shapes, such as, holes or the like.

In addition, in a further embodiment of the present disclosure, the multiple grooves 90 may be formed in the pipe cylindrical portion 29, the housing cylindrical portion 22 or the valve seat member 61 at unequal intervals in the circumferential direction thereof. Alternatively, one groove 90 may be formed in the pipe cylindrical portion 29, the housing cylindrical portion 22 or the valve seat member 61 in the circumferential direction thereof.

In addition, in a further embodiment of the present disclosure, the housing main body 21 and at least one of the pipe units 25 to 27 may be made of the same material and integrally formed with each other.

The present disclosure is preferably applied to the engine cooling system, in which the extraneous material, such as the casting sand, may be possibly contained in the cooling water. The present disclosure can be applied to any other cooling system, which cools down a device other than the engine. As above, the present disclosure is not limited to the above embodiments but can be implemented in various manners without departing from a spirit of the present disclosure.

The present disclosure is explained based on the embodiments. However, the present disclosure is not limited to those of the embodiments and the structures.

The present disclosure can include various kinds of modified embodiments as well as modifications within a scope of equivalents.

In addition, the present disclosure includes the followings in its category and its scope of thought: various combinations and configurations; and other combinations and configurations having one more element or one less element (or more than one element) added to or eliminated from the various combinations and configurations.

What is claimed is:

1. A cooling water control valve device for controlling a flow amount of cooling water passing through an internal combustion engine comprising:
    a housing unit having a cylindrical passage member, through which the cooling water flows;
    a valve unit having a valve main body rotatable around its axis and a valve opened portion formed at an outer peripheral surface of the valve main body, through which the cooling water passes;
    a valve seat unit having a positioned member of a cylindrical shape or an annular shape and a valve seat surface of an annular shape, wherein an outer peripheral surface of the positioned member is positioned by an inner peripheral surface of the cylindrical passage member and the positioned member is movable in an axial direction of the positioned member in a reciprocal manner, and wherein the valve seat surface is capable of holding a fluid tight condition between the valve main body and the valve seat surface when the valve seat surface is in contact with the outer peripheral surface of the valve main body on an axial side of the positioned member;
    a biasing member for biasing the valve seat unit in such a way that the valve seat surface is pushed to the outer peripheral surface of the valve main body; and multiple grooves formed in the cylindrical passage member at least in a part of an overlapping area, at which the cylindrical passage member and the positioned member overlap each other in an axial direction of the cylindrical passage member, wherein each of the grooves is formed in the inner peripheral surface of the cylindrical passage member in such a way that the groove is recessed in a radial-outward direction of the cylindrical passage member from the inner peripheral surface, wherein each of the grooves extends in the axial direction of the cylindrical passage member, and wherein the multiple grooves are arranged in a circumferential direction of the cylindrical passage member.

2. A cooling water control valve device for controlling a flow amount of cooling water passing through an internal combustion engine comprising:

a housing unit having a cylindrical passage member, through which the cooling water flows;

a valve unit having a valve main body rotatable around its axis and a valve opened portion formed at an outer peripheral surface of the valve main body, through which the cooling water passes;

a valve seat unit having a positioned member of a cylindrical shape or an annular shape and a valve seat surface of an annular shape, wherein an inner peripheral surface of the positioned member is positioned by an outer peripheral surface of the cylindrical passage member and the positioned member is movable in an axial direction of the positioned member in a reciprocal manner, and wherein the valve seat surface is capable of holding a fluid tight condition between the valve main body and the valve seat surface when the valve seat surface is in contact with the outer peripheral surface of the valve main body on an axial side of the positioned member;

a biasing member for biasing the valve seat unit in such a way that the valve seat surface is pushed to the outer peripheral surface of the valve main body; and multiple grooves formed in the cylindrical passage member at least in a part of an overlapping area, at which the cylindrical passage member and the positioned member overlap each other in an axial direction of the cylindrical passage member, wherein each of the grooves is formed in the outer peripheral surface of the cylindrical passage member in such a way that the groove is recessed in a radial-inward direction of the cylindrical passage member from the outer peripheral surface, wherein each of the grooves extends in the axial direction of the cylindrical passage member, and wherein the multiple grooves are arranged in a circumferential direction of the cylindrical passage member.

3. The cooling water control valve device according to claim 1, wherein the multiple grooves are formed in the circumferential direction of the cylindrical passage member, at least two of the multiple grooves are connected in the circumferential direction to form a connecting portion, and a profile of the connecting portion on a cross section perpendicular to an axis of the cylindrical passage member is formed by a curved line or a straight line, which is protruded in a radial direction of the cylindrical passage member.

4. The cooling water control valve device according to claim 1, wherein the multiple grooves are formed at equal intervals in the circumferential direction of the cylindrical passage member.

5. A cooling water control valve device for controlling a flow amount of cooling water passing through an internal combustion engine comprising:

a housing unit having a cylindrical passage member, through which the cooling water flows;

a valve unit having a valve main body rotatable around its axis and a valve opened portion formed at an outer peripheral surface of the valve main body, through which the cooling water passes;

a valve seat unit having a positioned member of a cylindrical shape or an annular shape and a valve seat surface of an annular shape, wherein an outer peripheral surface of the positioned member is positioned by an inner peripheral surface of the cylindrical passage member and the positioned member is movable in an axial direction of the positioned member in a reciprocal manner, and wherein the valve seat surface is capable of holding a fluid tight condition between the valve main body and the valve seat surface when the valve seat surface is in contact with the outer peripheral surface of the valve main body on an axial side of the positioned member;

a biasing member for biasing the valve seat unit in such a way that the valve seat surface is pushed to the outer peripheral surface of the valve main body; and multiple grooves formed in the positioned member at least in a part of an overlapping area, at which the cylindrical passage member and the positioned member overlap each other in the axial direction of the positioned member, wherein each of the grooves is formed in the outer peripheral surface of the positioned member in such a way that the groove is recessed in a radial-inward direction of the positioned member from the outer peripheral surface, wherein each of the grooves extends in the axial direction of the positioned member, and wherein the multiple grooves are arranged in a circumferential direction of the positioned member.

6. A cooling water control valve device for controlling a flow amount of cooling water passing through an internal combustion engine comprising:

a housing unit having a cylindrical passage member, through which the cooling water flows;

a valve unit having a valve main body rotatable around its axis and a valve opened portion formed at an outer peripheral surface, through which the cooling water passes;

a valve seat unit having a positioned member of a cylindrical shape or an annular shape and a valve seat surface of an annular shape, wherein an inner peripheral surface of the positioned member is positioned by an outer peripheral surface of the cylindrical passage member and the positioned member is movable in an axial direction of the positioned member in a reciprocal manner, and wherein the valve seat surface is capable of holding a fluid tight condition between the valve main body and the valve seat surface when the valve seat surface is in contact with the outer peripheral surface of the valve main body on an axial side of the positioned member;

a biasing member for biasing the valve seat unit in such a way that the valve seat surface is pushed to the outer peripheral surface of the valve main body; and multiple grooves formed in the positioned member at least in a part of an overlapping area, at which the cylindrical passage member and the positioned member overlap each other in the axial direction of the positioned member, wherein each of the grooves is formed in the inner peripheral surface of the positioned member in such a way that the groove is recessed in a radial-outward direction of the positioned member from the inner peripheral surface, wherein each of the grooves extends in the axial direction of the positioned member, and wherein the multiple grooves are arranged in a circumferential direction of the positioned member.

* * * * *